(12) United States Patent
Fujita et al.

(10) Patent No.: US 9,287,992 B2
(45) Date of Patent: Mar. 15, 2016

(54) WAVELENGTH DIVISION MULTIPLEXING TRANSMISSION DEVICE

(71) Applicant: FUJITSU LIMITED, Kawasaki (JP)

(72) Inventors: Takehiro Fujita, Yokohama (JP); Toshiki Honda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 553 days.

(21) Appl. No.: 13/688,829

(22) Filed: Nov. 29, 2012

(65) Prior Publication Data

US 2013/0148961 A1  Jun. 13, 2013

(30) Foreign Application Priority Data

Dec. 7, 2011 (JP) ................................ 2011-268433

(51) Int. Cl.
| | |
|---|---|
| *H04B 10/08* | (2006.01) |
| *H04B 10/572* | (2013.01) |
| *H04B 10/079* | (2013.01) |
| *H04B 10/296* | (2013.01) |
| *H04J 14/02* | (2006.01) |

(52) U.S. Cl.
CPC .......... *H04B 10/572* (2013.01); *H04B 10/0797* (2013.01); *H04B 10/296* (2013.01); *H04J 14/0221* (2013.01); *H04J 14/0227* (2013.01); *H04J 14/0258* (2013.01); *H04J 14/0272* (2013.01); *H04J 14/0275* (2013.01)

(58) Field of Classification Search
CPC .............. H04J 14/0221; H04J 14/0212; H04J 14/0201; H04J 14/0227; H04J 14/02; H04J 14/0209; H04B 10/0777; H04B 10/07955; H04B 10/294; H04B 10/296; H04B 10/07957; H04B 10/2931; H04B 10/2912; H04B 10/2942; H04B 10/0797; H04B 10/2914; H04B 10/572; H04B 10/079
USPC ......... 398/83, 79, 140, 173, 177, 202, 34, 25, 398/37, 38, 90, 95
See application file for complete search history.

(56) References Cited

U.S. PATENT DOCUMENTS

| | | | |
|---|---|---|---|
| 5,907,429 A | 5/1999 | Sugata | |
| 5,966,236 A * | 10/1999 | Okuno | G01J 11/00 359/337 |
| 6,445,720 B1 * | 9/2002 | Mukojima | H04J 14/0221 370/535 |
| 6,639,716 B1 | 10/2003 | Tomofuji | |
| 8,693,874 B2 * | 4/2014 | Suzuki | H04B 10/2942 359/341.1 |

(Continued)

FOREIGN PATENT DOCUMENTS

| | | |
|---|---|---|
| EP | 0 751 635 | 1/1997 |
| JP | 9-18410 | 1/1997 |

(Continued)

*Primary Examiner* — Hibret Woldekidan
(74) *Attorney, Agent, or Firm* — Staas & Halsey LLP

(57) ABSTRACT

A transmitter to be added or reduced turns ON/OFF an optical output. A relay station and a receiving terminal station acquire the amount of fluctuation of the optical output of the received signal light when the optical output of the added transmitter is turned ON and OFF. From the amount of fluctuation of the optical output, the number of wavelengths after the addition or reduction is acquired. Without an OSC signal, each station may be informed of the number of wavelengths. Therefore, the configuration for transmitting and receiving the OSC signal is not requested, thereby reducing the total cost, appropriately controlling the gain of the optical amplifier, and successfully maintaining transmission quality.

10 Claims, 19 Drawing Sheets

(56) References Cited

U.S. PATENT DOCUMENTS

| | | | |
|---|---|---|---|
| 2002/0039226 A1 | 4/2002 | Murakami et al. | |
| 2002/0093705 A1* | 7/2002 | Okano | H04B 10/077 398/37 |
| 2005/0238362 A1* | 10/2005 | Sekiya | H04B 10/25133 398/147 |
| 2006/0269284 A1* | 11/2006 | Fujita | H04B 10/077 398/38 |
| 2007/0206955 A1* | 9/2007 | Uda | H04B 10/0777 398/177 |
| 2007/0274725 A1* | 11/2007 | Takeyama | H04B 10/506 398/93 |
| 2008/0253763 A1* | 10/2008 | Uda | H04B 10/0777 398/34 |
| 2008/0285973 A1* | 11/2008 | Uchiyama | H04B 10/07955 398/83 |
| 2010/0158532 A1* | 6/2010 | Goto | H04B 10/07955 398/81 |
| 2010/0239263 A1* | 9/2010 | Tokura | H04B 10/296 398/94 |
| 2011/0199672 A1* | 8/2011 | Takeyama | H01S 3/06758 359/337 |

FOREIGN PATENT DOCUMENTS

| | | |
|---|---|---|
| JP | 10-262032 | 9/1998 |
| JP | 2000-232433 | 8/2000 |
| JP | 2002-57394 | 2/2002 |
| JP | 2007-228627 | 9/2007 |

* cited by examiner

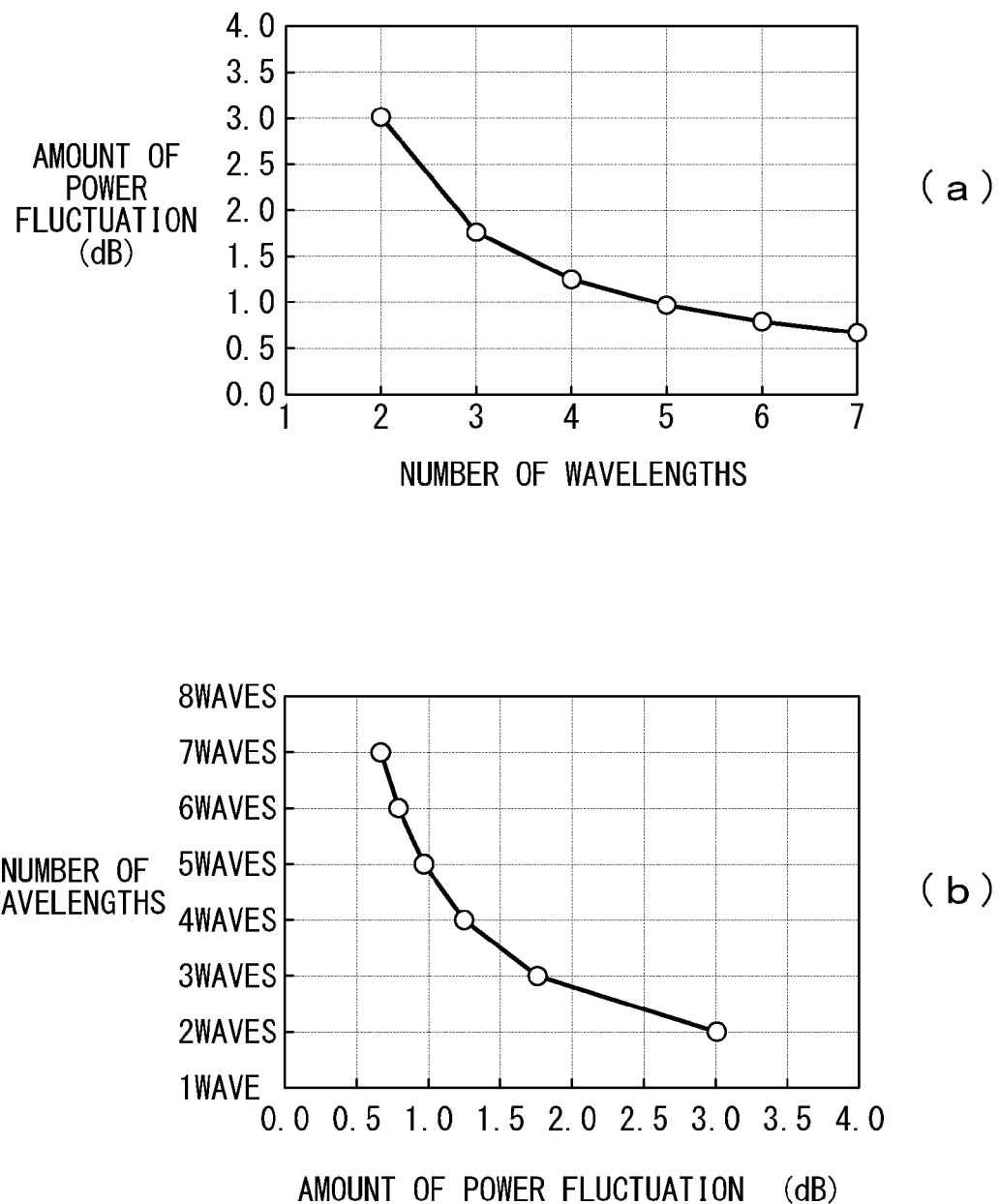
F I G. 4

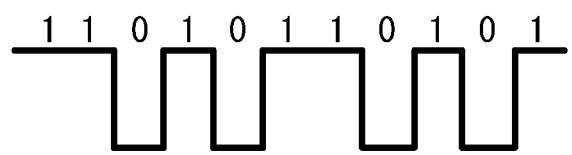
F I G. 5

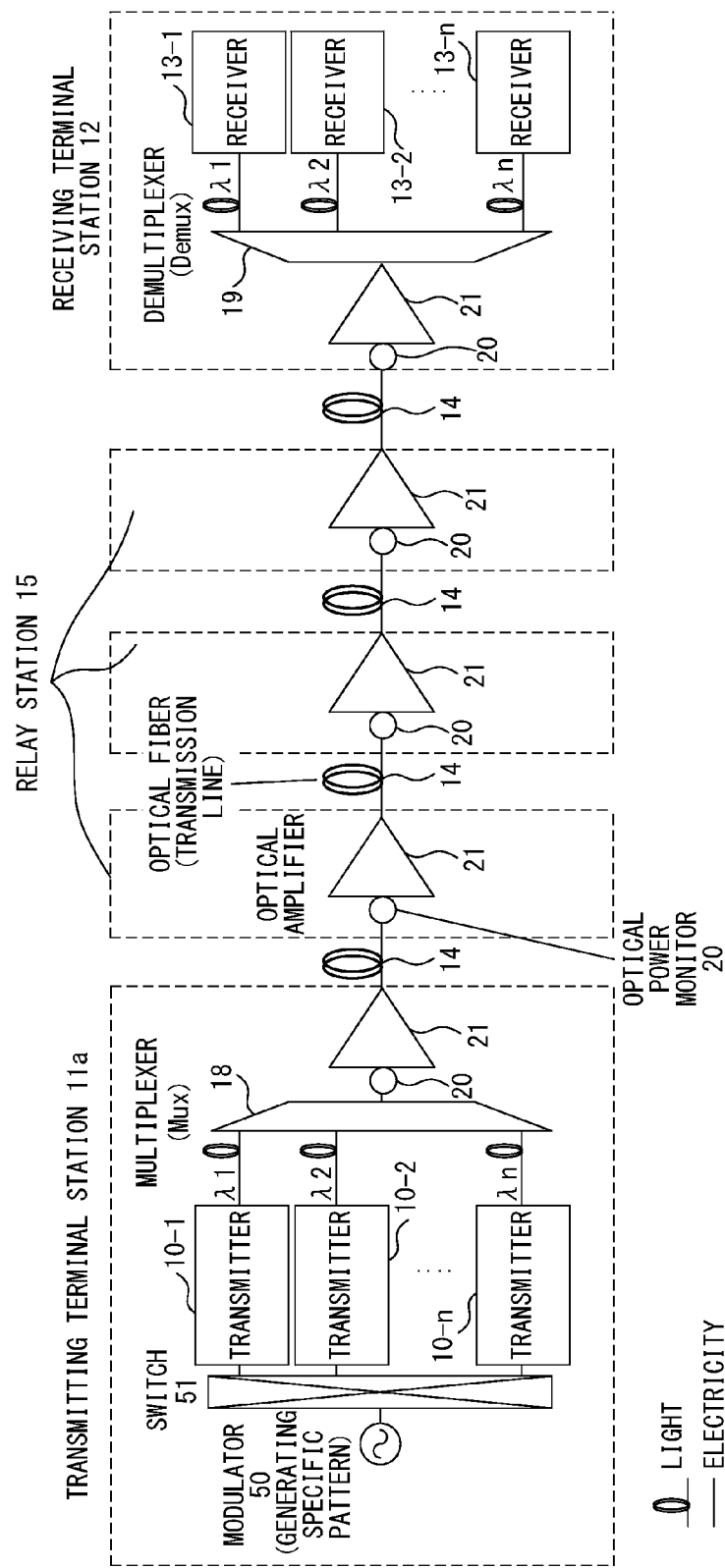
F I G. 11

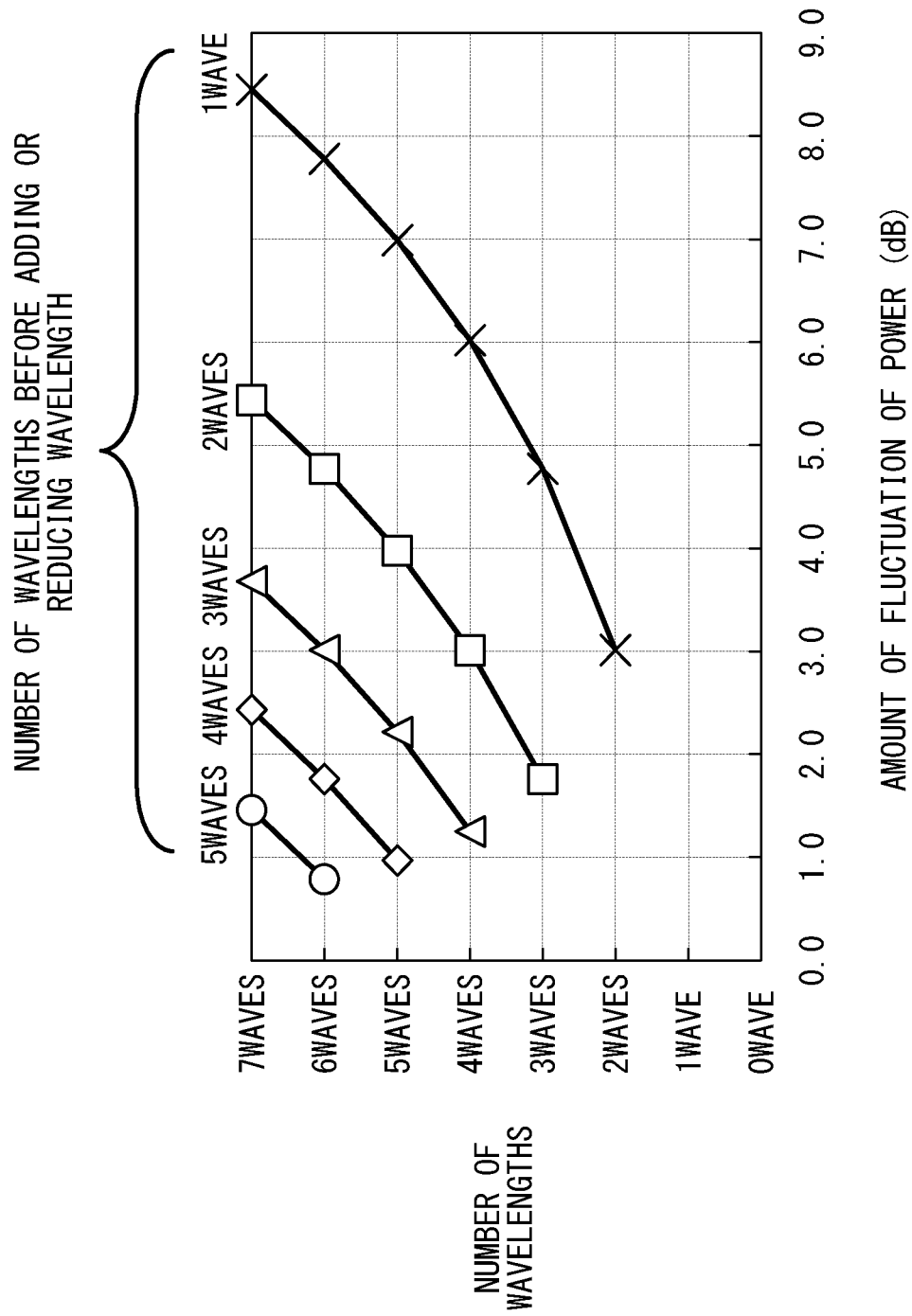
F I G. 1 3

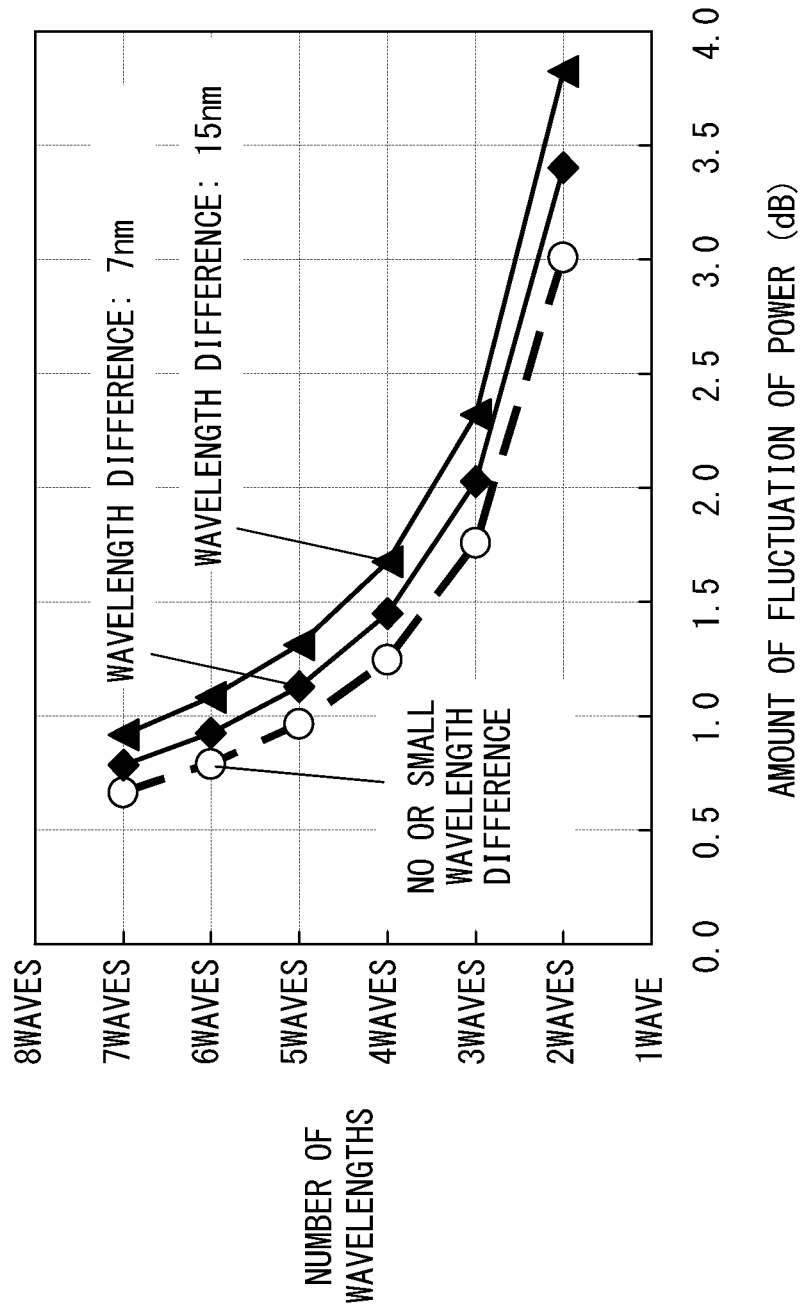
F I G. 1 6

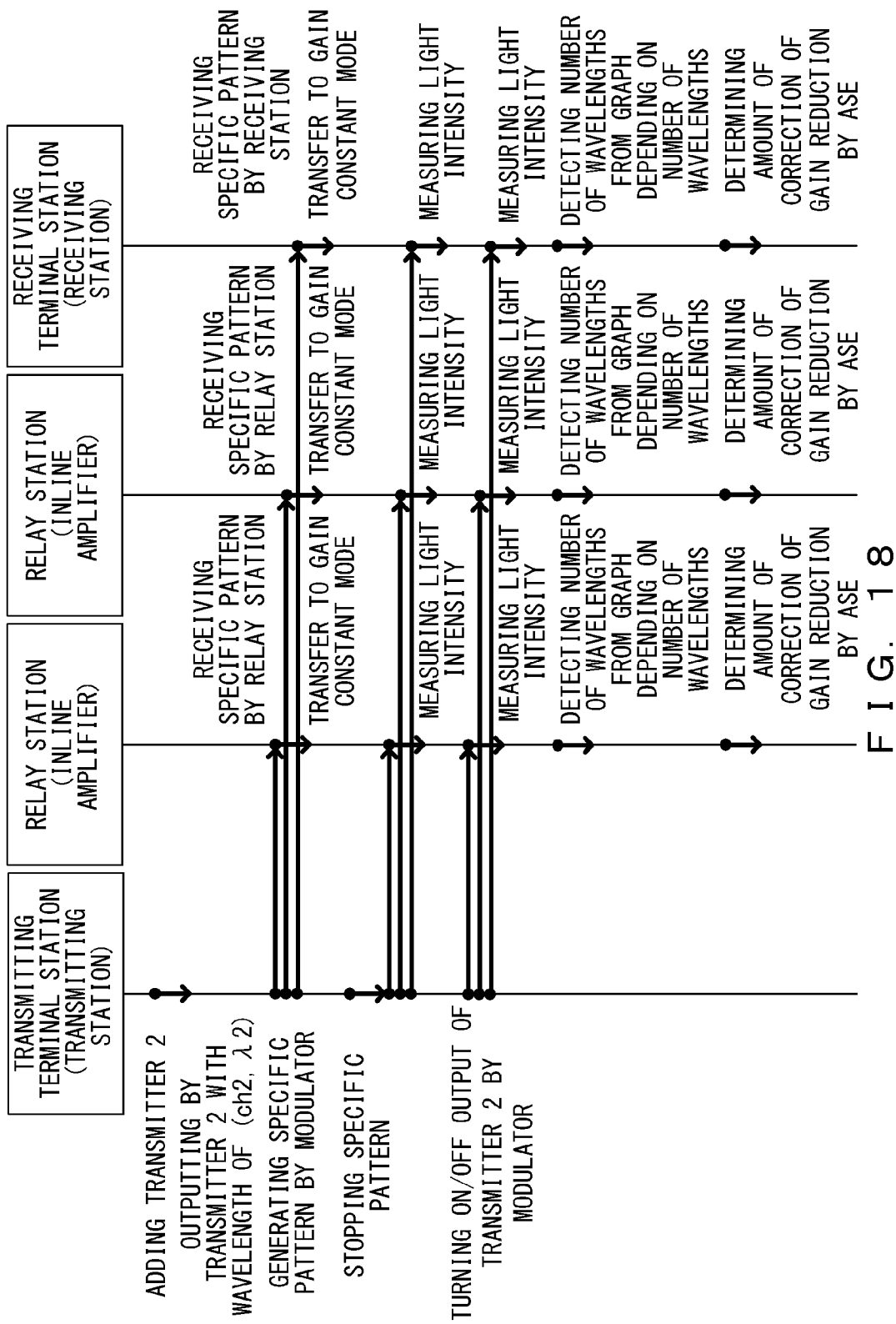
F I G. 1 8

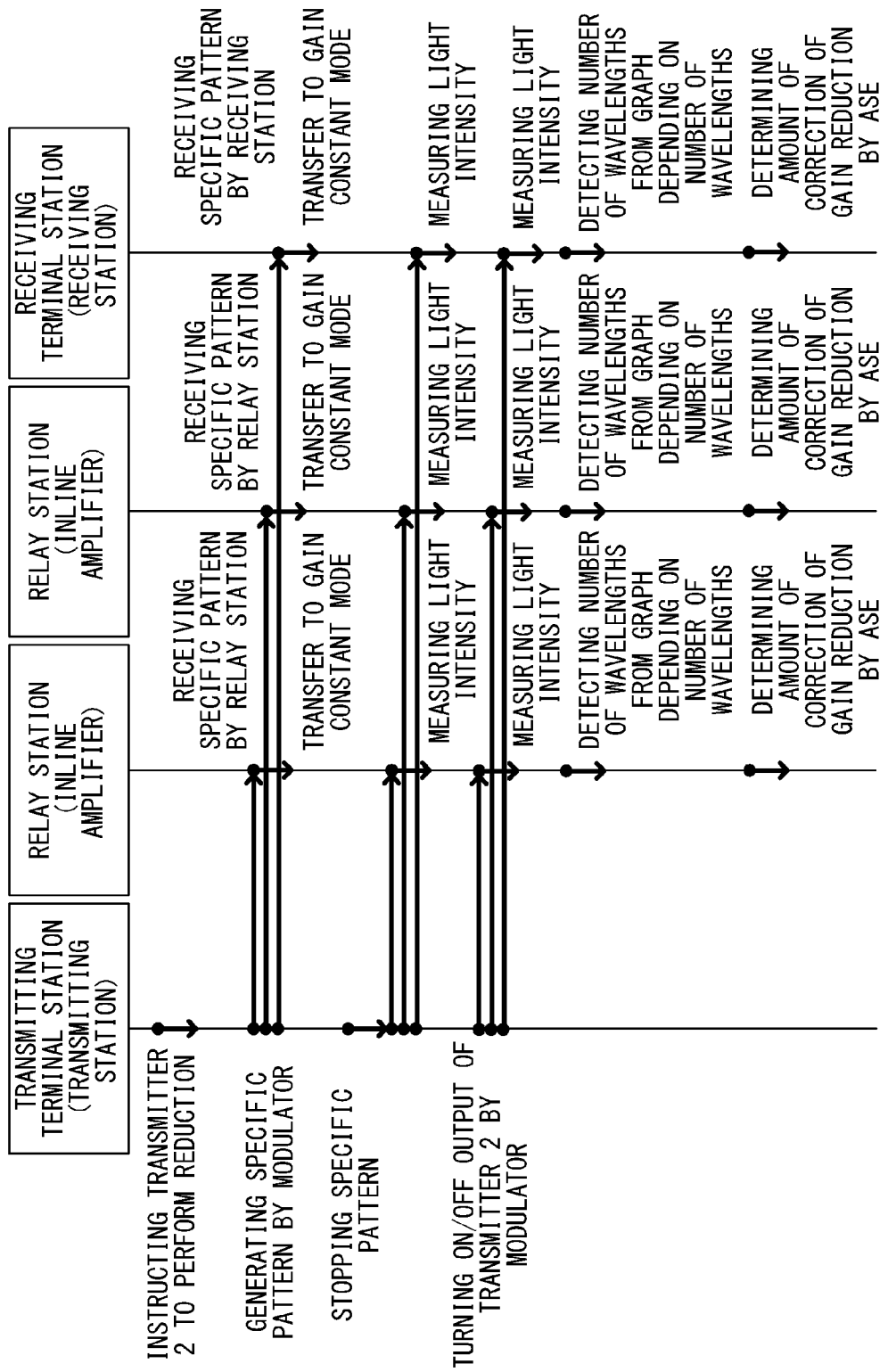
F I G. 19

WAVELENGTH DIVISION MULTIPLEXING TRANSMISSION DEVICE

CROSS-REFERENCE TO RELATED APPLICATIONS

This application is based upon and claims the benefit of priority of the prior Japanese Patent Application No. 2011-268433, filed on Dec. 7, 2011, the entire contents of which are incorporated herein by reference.

FIELD

The following embodiments are related to a wavelength division multiplexing transmission device.

BACKGROUND

The optical network construction has been put to practical use by a wavelength division multiplexing (WDM) transmission technique. Recently, the WDM transmission device has been applied not only to a basic network (backbone network) of a large capacity, but also to a relatively small network (metro network, access network, etc.).

Low cost equipment is especially demanded in the above-mentioned small network. However, there is a case in which the transmission function is limited by deleting some functions by cost reduction.

FIG. 1 is an example of a configuration of a network by a WDM transmission device.

The network is configured by a transmitting terminal station 11 in which transmitters 10-1 through 10-$n$ are arranged, a receiving terminal station 12 in which receivers 13-1 through 13-$n$ are arranged, and a relay station 15, which is provided with an inline optical amplifier connected by a transmission line 14 of optical fiber, between the transmitting terminal station 11 and the receiving terminal station 12.

Generally, in the WDM transmission system, it is requested to exchange information between stations. There are methods proposed for transmitting various types of information between the stations.

For example, there is a method of preparing an optical supervisory channel (OSC) for monitor control in addition to a main signal, multiplexing the channel to the main signal, and transmitting a resultant signal (refer to Patent Documents 2 and 3).

The transmitters 10-1 through 10-$n$ transmit the signal light of different wavelengths λ1 through λn, and the signal light is multiplexed by a multiplexer 18. Furthermore, the OSC signal from a transmitter 17 of optical supervisory channel (OSC) for monitor control is multiplexed to the signal light of wavelengths λ1 through λn, and transmitted as WDM signal light from the transmitting terminal station 11. The WDM signal light from the transmitting terminal station 11 propagates the transmission line 14 configured by optical fiber, and is input to the transmission line 14. The transmission line 14 receives the OSC signal by an OSC receiver, processes the OSC signal, transmits the signal by the OSC receiver, amplifies the main signal by the optical amplifier, and transfers the signal. The receiving terminal station 12 extracts the OSC signal from the WDM signal light received from the transmission line 14, the signal is received by an OSC receiver 16, and the main signal is input to a demultiplexer 19. The demultiplexer 19 demultiplexes the WDM signal light to signal light of each wavelength, inputs the light to the receivers 13-1 through 13-$n$ for the respective wavelengths, and a signal is output by the receivers 13-1 through 13-$n$.

The OSC is received by the OSC receiver 16 in each station and opto-electriccally converted, and then requested information is retrieved. Then, it is electro-optically converted by the transmitter 17 for the OSC, and transmitted to the next station.

An example of the information exchanged between the stations is described below.

each type of command for remotely controlling a device or acquiring requested information information about presence/absence of an issue of a warning various types of light feature information such as light intensity input to a device, output power of an optical amplifier, etc.

number of wavelengths of light being processed

Especially, the number of wavelengths of light being processed is used for control of an optical amplifier in a wavelength division multiplexing transmission device, transmitted to each downstream station by OSC etc., and used in control of an optical variable attenuator for correcting the gain of the optical amplifier, and adjusting the input power of the optical amplifier.

In the wavelength division multiplexing transmission system, an optical amplifier of rare-earth-doped fiber such as erbium etc., a semiconductor optical amplifier, etc. are often used as an optical amplifier.

With the above-mentioned optical amplifier, the amplifier itself generates noise light when signal light is amplified. It is known as amplified spontaneous emission (ASE).

The gain of the optical amplifier is controlled by arranging a detector using a photodiode etc. to detect light intensity in the input unit and the output unit of the optical amplifier, and detecting the ratio of the light intensity.

However, the detector of the light intensity does not discriminate the signal light from the ASE generated by the optical amplifier, but the detected light intensity includes both signal light and ASE. Based on the light intensity information including the ASE, the gain of the optical amplifier is controlled. Therefore, when the ratio of the intensity of the signal light in the total light intensity is low, the effective gain to the signal light is degraded.

The low ratio of the intensity of the signal light in the light intensity is especially outstanding when the number of wavelengths is smaller.

FIG. 2 is an example of calculating the amount of gain reduction by the ASE.

In the calculation in the graph illustrated in FIG. 2, the following conditions are set.

| | |
|---|---:|
| wavelength | 1547 nm |
| gain of optical amplifier | 20 dB |
| noise coefficient of optical amplifier | 5 dB |
| ASE generation band width | 30 nm |
| intensity of output power of optical amplifier (par wave) | 0 dBm |
| loss between relay stations | 20 dB |

FIG. 2 illustrates the case in which the number of inline optical amplifiers cascade-connected by the transmission line is 1 through 3 stages. In each case, as the number of wavelengths becomes larger, the amount of gain reduction of the signal light becomes smaller. That is, when the number of wavelengths is small, the amount of gain reduction of the signal light becomes large.

Thus, with the gain of the optical amplifier effectively reduced with respect to the signal light, the lower optical SN ratio and the lower level of receiver input may occur, thereby degrading the transmission performance.

There are some methods of correcting the reduction of the gain to the signal light (refer to the patent document 4).

In the method of the patent document 4, the amount of correction (amount of the added gain) of the requested gain is determined by calculation or from a prepared correction amount table.

When the amount of correction of gain is determined, the wavelength number information is requested. The wavelength number information is normally acquired at the transmitting terminal station, and transmitted to the inline amplifier (relay station) arranged downstream.

Some other conventional techniques (for example, patent document 1) may detect the number of wavelengths depending on the input light level of an input optical signal.

DOCUMENT OF PRIOR ART

Patent Document

[Patent Document 1] Japanese Laid-open Patent Publication No. 10-262032
[Patent Document 2] Japanese Laid-open Patent Publication No. 9-18410
[Patent Document 3] Japanese Laid-open Patent Publication No. 2007-228627
[Patent Document 4] Japanese Laid-open Patent Publication No. 2002-57394

In the network in which the low cost equipment is prioritized, no OSC may be used. By deleting the OSC function, the optical parts of the transmitter/receiver of the OSC, the multiplexing/demultiplexing filter, etc. or the circuit etc. for terminating and acquiring the information from the OSC signal are not required, thereby reducing the total cost.

However, when the notification device of the information among the stations is not available, the number of wavelengths is not reported to the downstream relay stations (inline amplifiers). Therefore, it is not possible to estimate an appropriate value of the amount of gain reduction with respect to the signal light by the ASE in the optical amplifier depending on the number of processed wavelengths.

In this case, since it is requested to determine the maximum available transmission distance and the maximum inter-station loss by considering the gain reduction by the ASE, the degradation of the transmission performance is caused.

Therefore, the techniques which satisfy the following conditions are requested.

detecting the number of wavelengths without influence on the signal being transmitted detecting the number of wavelengths even when there is no device of notifying other stations of the information correcting the gain reduction by the ASE according to the detected wavelength number information applying to the network in which a plurality of inline optical amplifiers are cascade-connected

SUMMARY

The wavelength division multiplexing transmission device according to an aspect of the following embodiments is used in a wavelength division multiplexing transmission system which transmits signal light from a transmitting terminal station, and includes: an optical intensity detection unit which detects the light intensity of the signal light transmitted from the transmitting terminal station when the output of the transmitter added or reduced in the transmitting terminal station is turned ON and OFF; and a wavelength number detection unit which detects the number of added or reduced wavelengths from the amount of fluctuation of the light intensity detected by the light intensity detection unit when the output of the transmitter is turned ON and OFF.

According to the embodiments below, a wavelength division multiplexing transmission device capable of realizing a lower cost may be provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory view (2) of a first configuration example of an embodiment of the present invention;
FIG. 5 is an explanatory view (3) of a first configuration example of an embodiment of the present invention;
FIG. 11 is an explanatory view (1) of a second configuration example of an embodiment of the present invention;
FIG. 13 is an explanatory view (3) of a second configuration example of an embodiment of the present invention;
FIG. 16 is an explanatory view (1) of a third configuration example of an embodiment of the present invention;
FIG. 18 is an explanatory view (3) of a third configuration example of an embodiment of the present invention;
and
FIG. 19 is an explanatory view (4) of a third configuration example of an embodiment of the present invention.

DESCRIPTION OF EMBODIMENTS

FIGS. 3 through 10 are explanatory views of a first configuration example of an embodiment of the present invention.

Figure 1:
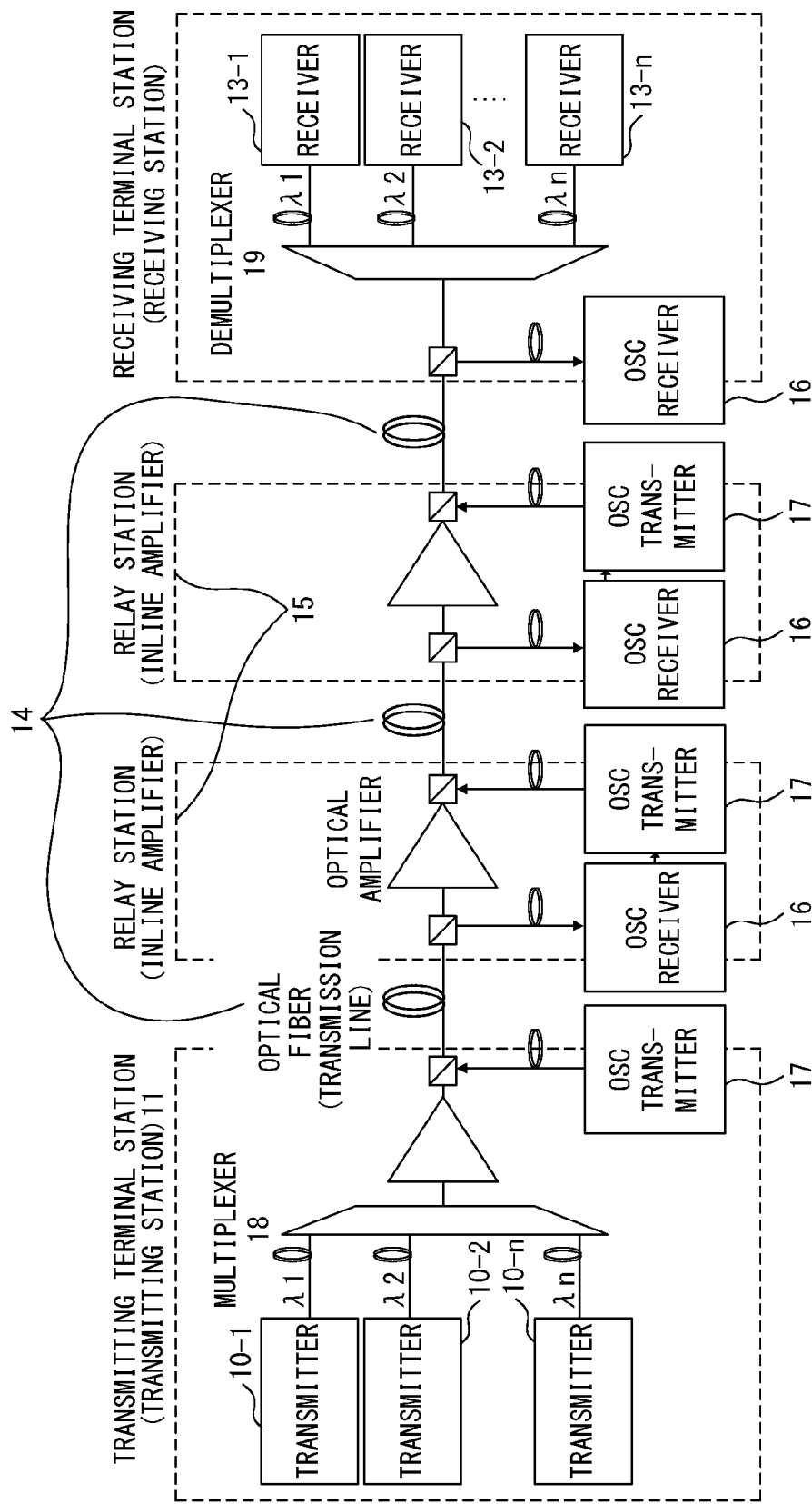
FIG. 1 is an example of a configuration of the network according to the WDM transmission device.
Figure 3:
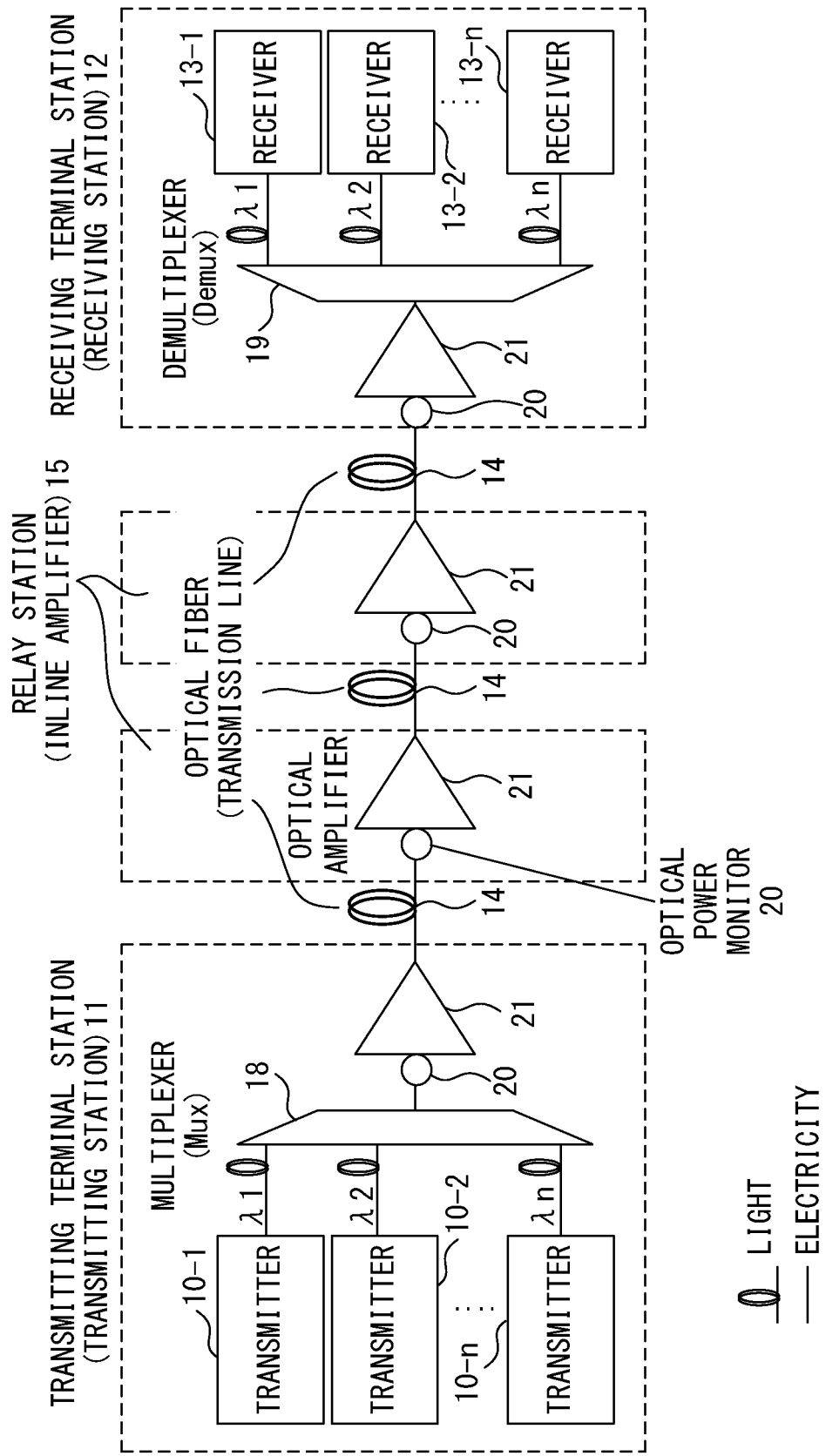
FIG. 3 is an explanatory view (1) of a first configuration example of an embodiment of the present invention.

FIG. 3 is a configuration of a system. In FIG. 3, the component also illustrated in FIG. 1 is assigned the same reference numeral, and the explanation is omitted here.

The system is configured by the terminal stations (transmitting station and receiving station) 11 and 12, and the relay station 15 in which an inline optical amplifier is arranged.

The terminal station (transmitting station) 11 is provided with transmitters 10-1 through 10-n. These transmitters 10-1 through 10-n have the function of modulating the intensity at a low speed sufficiently lower than the modulation speed (for example, 10 Gbit/s) of the main signal. The low speed refers to, for example, 1 kHz etc.

Figure 2:
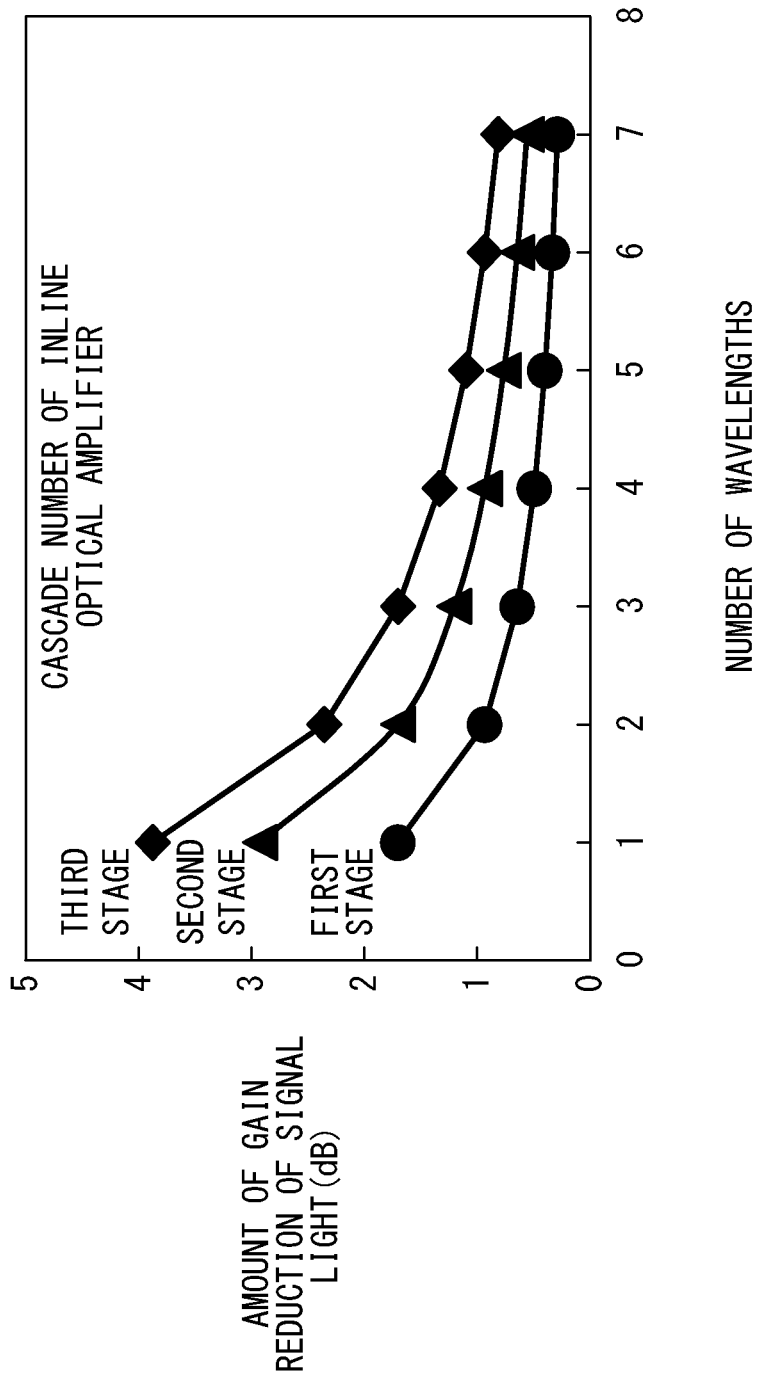
FIG. 2 is an example of calculating the amount of gain reduction by ASE.

In an optical amplifier 21 arranged for the relay station 15 and the receiving terminal station 12, an optical power monitor 20 for monitoring the light intensity is arranged in the input unit or the output unit (FIG. 3 illustrates only the case in which it is provided in the input unit). In the detailed configuration of the optical amplifier 21, an optical power monitor is provided before and after the optical amplification unit to perform AGC control and ALC control. In the present embodiment, since the monitor value of the optical power monitor of one of the optical power monitors before and after the optical amplification unit may be used, an optical power monitor is arranged as an example only on the input side of the optical amplifier 21 in FIG. 2.

In the transmitting terminal station 11, the signal light of each wavelength transmitted from the transmitters 10-1 through 10-n is multiplexed by the multiplexer 18, collectively amplified by the optical amplifier 21, and output to the transmission line 14. The relay station 15 collectively adds and transfers the WDM signal light propagated through the transmission line 14. In the receiving terminal station 12, after the transmitted WDM signal light is amplified, it is demultiplexed into the signal light of each wavelength by the demultiplexer 19. The demultiplexed signal light of each wavelength is received by each of the receivers 13-1 through 13-n.

As an example of the explanation of the operation, a method of detecting the number of wavelengths after increasing the wavelengths when the signal light is sequentially added from the state of the operation of one wave is described below.

In the initial state, the power corresponding to the light intensity of one wave propagates in the optical fiber as a transmission line, and the power may be measured by the power monitor in each inline relay station.

When the second wave is added from the state above, the light intensity detected similarly in the inline relay station increases by 3 dB from the one-wave transmission, and when one more wave is added from the 2-wave transmission state, it is assumed that the light intensity has increased by 1.8 dB from the 1-wave transmission.

Similarly, the relationship as illustrated in part (a) in FIG. 4 is obtained by plotting the relationship of the total optical power in the transmission line when the signal light is added wave by wave. That is, the total number of wavelengths may be obtained after the signal light is added from the amount of fluctuation of the light intensity before and after the addition of the signal light. Illustrated in part (b) in FIG. 4 is the conversion from the amount of fluctuation of power to the total number of wavelengths (after the addition of the wavelengths). Part (b) in FIG. 4 illustrates the vertical axis of the graph in part (a) in FIG. 4 as the horizontal axis, and the horizontal axis as the vertical axis.

The case in which a wavelength is added is described above, but similarly a wavelength may be deleted. That is, light intensity increases by 1.8 dB when the 2-wave transmission state is changed into the 3-wave transmission state. On the other hand, when the 3-wave transmission is changed into the 2-wave transmission, the light intensity is reduced by 1.8 dB. Therefore, the graphs of (a) and (b) in FIG. 4 illustrate the total number of wavelengths may be calculated from the amount of decrease of the light intensity.

The data of the graph of (a) or (b) in FIG. 4 may be obtained by a simulation, or by performing an experiment. To consider the variance of the characteristic of the actual device, it is effective to acquire the data of the graph by actually performing the experiment.

Described below is the procedure of the process.

The case in which the state of an operation with one wave of signal light (wavelength $\lambda 1$) is changed with an addition of the second wave of signal light (wavelength $\lambda 1$) is explained below.

The transmitter for outputting the signal light of the wavelength $\lambda 2$ is added, and the output is started with the wavelength of $\lambda 2$. To output the specific pattern from the added transmitter, the light intensity of the output power of the transmitter is modulated. The specific pattern is to notify in advance that the number of wavelengths changes, to each relay station and the receiving terminal station (in this example, the wavelength is added).

The modulation speed of the specific pattern is, for example, several kHz, and is sufficiently lower than the modulation speed (for example, 10 Gbit/s) of the main signal.

FIG. 5 is an example of a specific pattern.

FIG. 5 illustrates the pattern of "11010110101", but any pattern is available so far as it indicates the addition of the number of wavelengths. It is assumed that the modulation speed is sufficiently low not to incur an error in the main signal on the receiving side although the intensity modulation is added to the main signal. For example, the duration of 1 bit, that is, the width of 1 bit, is several tens ms through 1 s. When the number of wavelengths is reduced, a specific pattern different from that in the addition of the number of wavelengths is prepared. Any pattern is available so far as it indicates the decrease of the number of wavelengths. It is assumed that the modulation speed is the same as the speed for the specific pattern at the addition of the number of wavelengths.

The power of the signal light which is wavelength multiplexed at the input unit of each receiving terminal station or receiving terminal station arranged downstream is monitored. Since a specific pattern is assigned only to the signal light to be added, and not to the signal light in operation, there is no undesired influence. When the wavelength is reduced, a specific pattern is assigned only to the signal light of the wavelength to be deleted.

When a specific pattern is detected at the power monitor arranged at the input unit of the relay station in which each inline optical amplifier is arranged and the receiving terminal station, the optical amplifier is switched to, for example, the automatic gain control (AGC) as the wavelength number detection state.

When the optical amplifier is automatic level control (ALC) in a normal operation state, the specific pattern may be assigned to a downstream station by switching the control to the AGC control. (In the ALC, the power fluctuation by the specific pattern is absorbed by the ALC control. Therefore, the specific pattern is not transmitted to a downstream station.) Therefore, when the relay station performs the ALC control, the relay station closest to the transmitting terminal station before receiving the AGC control is to detect the specific pattern. Then, control is changed to the AGC control sequentially starting with the relay station closest to the transmitting terminal station to detect the specific pattern.

Hereafter, upon receipt of the specific pattern, control is changed to the AGC state sequentially starting with the inline optical amplifier of the relay station arranged upstream toward the downstream receiving terminal station. The transmitter to be added waits for the time (standby time) until the optical amplifier arranged in the relay station and the receiving terminal station is changed to the AGC state. The standby time is set as the time in which all relay stations and receiving terminal stations have been completely changed to the AGC state after the designer of the system estimates the number of relay stations and the response time etc. of the inline optical amplifier.

Normally, an upper limit is set for the number of relay stations arranged between the transmitting and receiving terminal stations. Therefore, the time requested for the optical amplifiers of all relay stations and receiving terminal stations to change to the AGC state may be estimated relatively easily.

Then, the transmission of a specific pattern by an added transmitter is stopped, and control is passed to the normal modulation state. Then, the output level of the added transmitter is repeatedly turned ON and OFF for a specified time. The operation of turning ON/OFF is slowly performed not to have undesired influence on the operation of the optical amplifier and other signals being processed. Since the light intensity after the addition is obtained when the added transmitter is ON, and the light intensity before the addition is obtained when it is OFF, the change of the light intensity before and after the addition may be detected.

The optical power monitor of the input unit of the optical amplifier of the relay station and the receiving terminal station measures the amount of fluctuation of the light intensity of the WDM light at this time. The data of the graph in part (a) or (b) in FIG. 4 is held in each relay station and receiving terminal station. From the amount of fluctuation of the light intensity, the number of wavelengths after the addition of wavelengths is obtained. The correction for compensation for the amount of gain reduction by the ASE is acquired depending on the number of wavelengths, thereby setting the gain of the optical amplifier.

As known from part (a) or (b) in FIG. 4, the number of wavelengths becomes larger, the amount of fluctuation of the light intensity generated when the wavelengths are added (or reduced) becomes smaller. It indicates that higher accuracy is requested when the number of wavelengths is obtained from the amount of fluctuation of the light intensity, causing the problem that a more expensive detection circuit etc. is requested. However, the amount of gain reduction for the signal light by the ASE which is determined according to the wavelength number information suddenly decreases with an increasing number of wavelengths (refer to Japanese Laid-open Patent Publication No. 2000-232433).

Therefore, since the reduction of the gain with an increasing number of wavelengths is small with respect to the conversion from the amount of fluctuation of the light intensity to the number of wavelengths when the number of wavelengths increases, it is not requested to determine the number of wavelengths with high accuracy. If the amount of fluctuation of the light intensity is smaller to some extent or it is not detected, then it indicates that the number of wavelengths is sufficiently large, and no gain correction is performed on the signal light by the ASE.

Figure 6:
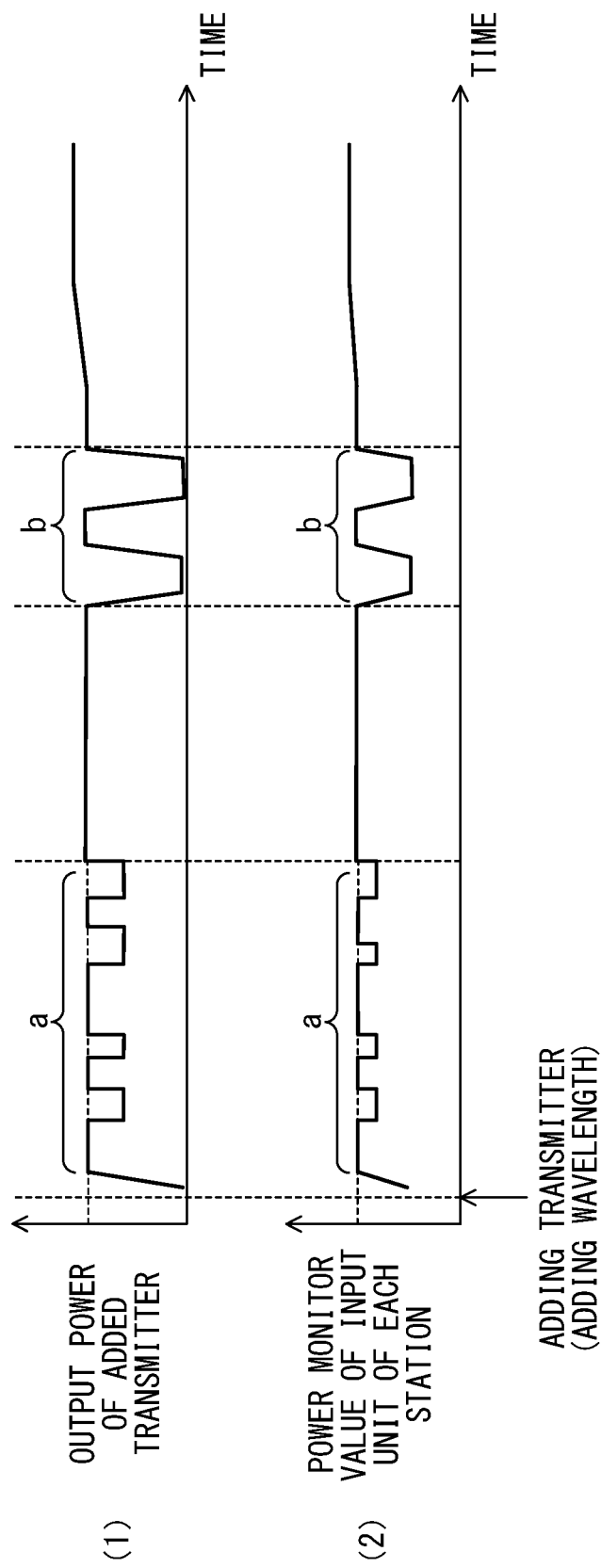
FIG. 6 is an explanatory view (4) of a first configuration example of an embodiment of the present invention.

FIG. 6 illustrates the fluctuation of the intensity of light transmitted from the transmitter and the fluctuation of the intensity of light received by the relay station and the receiving terminal station.

(1) in FIG. 6 indicates the fluctuation of the intensity of light transmitted from the added transmitter. Part a in FIG. 6 is a specific pattern indicating that the number of wavelengths is to be added, and part b indicates the ON/OFF operation for detection of the fluctuation of light intensity. (2) in FIG. 6 is an example of the light intensity detected by the power monitor of the relay station and the receiving terminal station. Part a is a specific pattern, and part b is the waveform of the ON/OFF operation. In the relay station and the receiving terminal station, since the light intensity of the original signal light is detected together, the specific pattern from the transmitter which is to be added or reduced or the fluctuation of the light intensity as a result of the ON/OFF operation depends on the number of the original signal light. For example, the fluctuation of the light intensity of the added transmitter in (2) in FIG. 6 is 0 or the maximum by the ON/OFF operation of part b while the detection value of the power monitor in (2) in FIG. 6 is smaller in width of the fluctuation of the light intensity in b. The width of the fluctuation of the light intensity is detected, and the number of wavelengths is acquired from the graph of (a) or (b) in FIG. 4.

Figure 7:
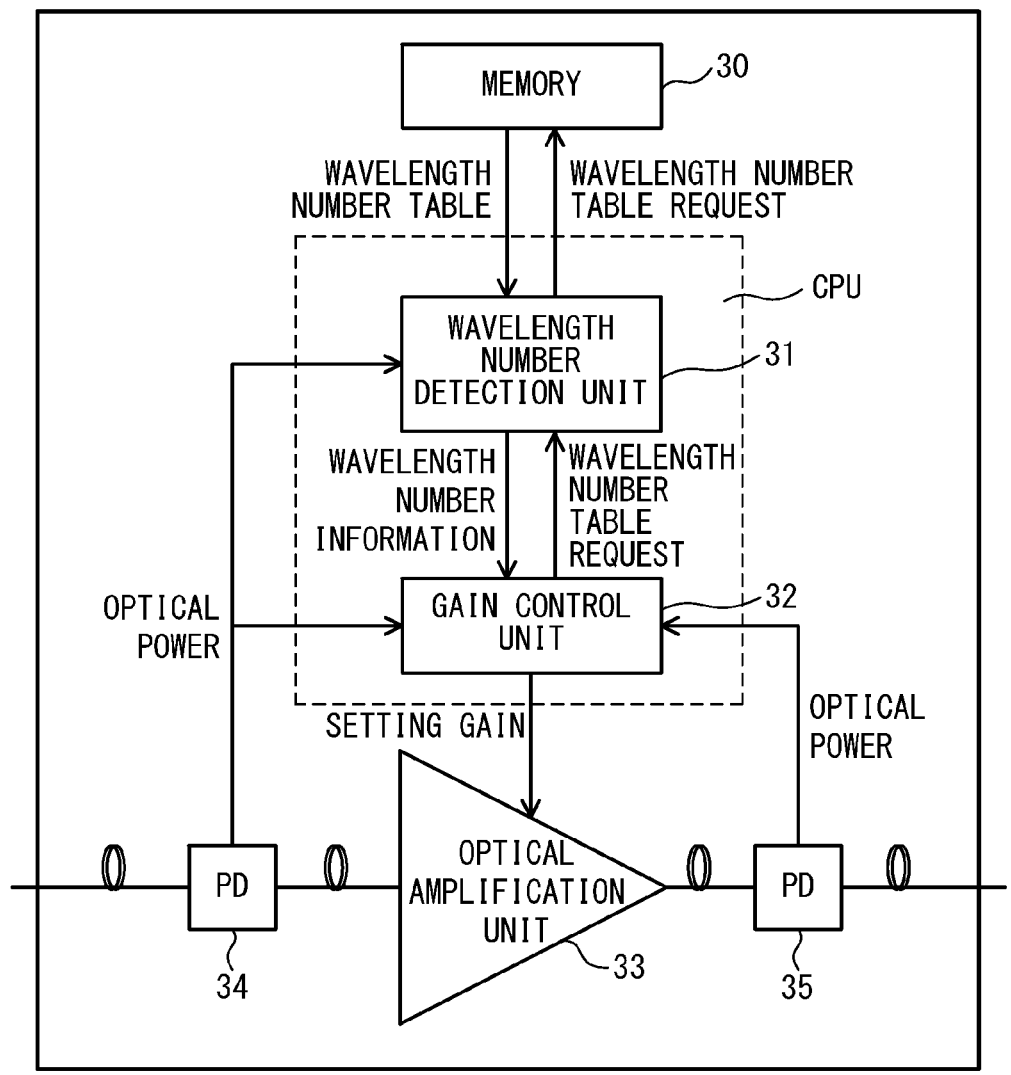
FIG. 7 is an explanatory view (5) of a first configuration example of an embodiment of the present invention.

FIG. 7 is a configuration of the relay station or the receiving terminal station according to the present embodiment.

On the input and output sides of an optical amplification unit 33, photodiodes 34 and 35 for detecting the light intensity (optical power) of the WDM signal light are provided. The optical power detected by the photodiodes 34 and 35 is transmitted to a gain control unit 32. The gain control unit 32 controls again so that the gain of the optical amplification unit 33 indicates a constant value in the AGC control while the output light intensity of the optical amplification unit 33 indicates a constant value in the ALC control. Furthermore, when the specific pattern is detected from the fluctuation of the light intensity detected by the photodiode 34, the gain control unit 32 sets the operation under the AGC control, and starts the process of detecting the number of wavelengths by the wavelength number detection unit 31.

The wavelength number detection unit 31 detects the number of wavelengths after the addition or reduction from the fluctuation of the light intensity which occurs by the ON/OFF operation of the transmitter and is detected by the photodiode 34, and transmits the wavelength number information to the gain control unit 32. Upon receipt of the wavelength number information, the gain control unit 32 sets the gain based on the number of wavelengths in the optical amplification unit 33. The wavelength number detection unit 31 refers to the data (also called a wavelength number table) of the graph indicating the amount of fluctuation of the number of wavelengths and the optical power as illustrated by (1) or (2) in FIG. 4, and detects the number of wavelengths. The wavelength number detection unit 31 and the gain control unit 32 may be configured by a circuit, a processor, an FPGA (field-programmable gate array), etc. For example, the wavelength number detection unit 31 and gain control unit 32 is configured by the CPU, and realizes the function by executing a program. In addition, the wavelength number detection unit 31 and the gain control unit 32 may be used in a chip, and presented to a user.

Figure 8:
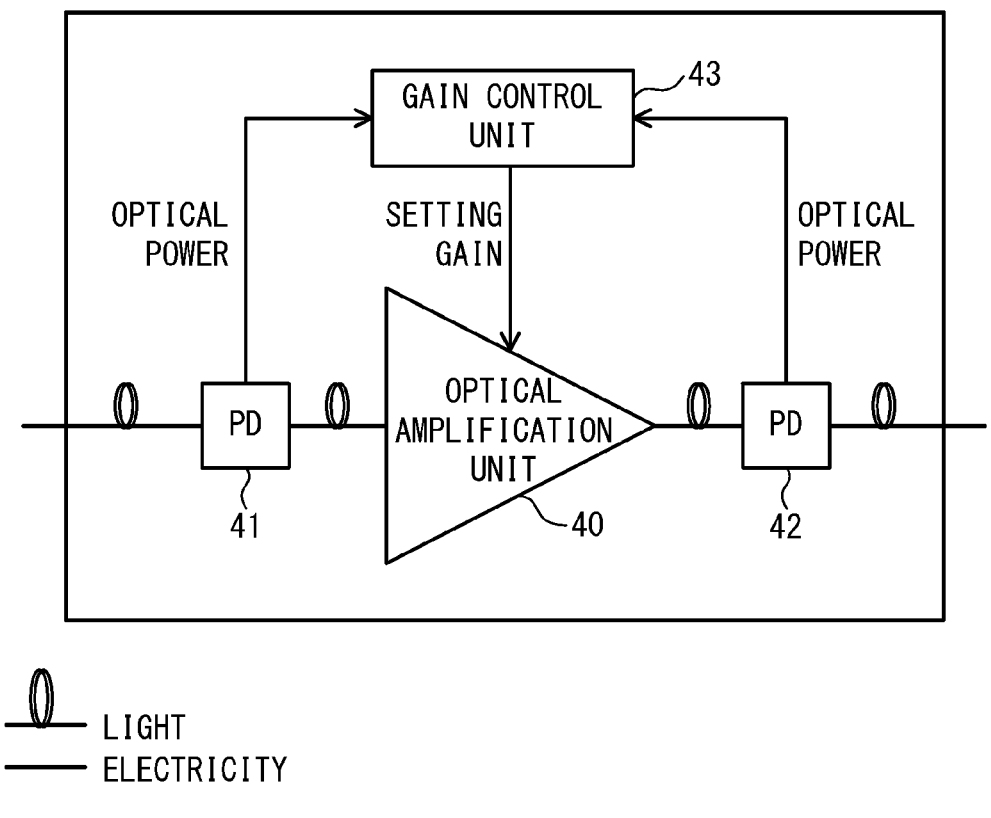
FIG. 8 is an explanatory view (6) of a first configuration example of an embodiment of the present invention.

FIG. 8 is a configuration of a transmitting terminal station.

The optical amplifier in the transmitting terminal station may have a configuration similar to that of the prior art. Photodiodes 41 and 42 detect the light intensity (optical power) on the input and output sides of an optical amplification unit 40. The detected light intensity is transmitted to the gain control unit 43, and is used in setting the gain of the optical amplification unit 40. In the ALC control, the gain of the optical amplification unit 40 is controlled so that the light intensity detected by the photodiode 42 may be constant. In the AGC control, the gain of the optical amplification unit 40 is controlled so that the ratio of the light intensity detected by the photodiode 42 and the light intensity detected by the photodiode 41 may be constant. If the control unit of the transmitting terminal station not illustrated in the attached drawings inputs to the gain control unit 43 a control signal indicating that the number of wavelengths is changed, then the gain control unit 43 sets the gain control as the AGC control. If the control signal indicating that the addition or reduction of the wavelengths has been completed is input to the gain control unit 43, then the gain control unit 43 sets the gain control as normal control. The normal control may be the AGC control or the ALC control.

Figure 9:
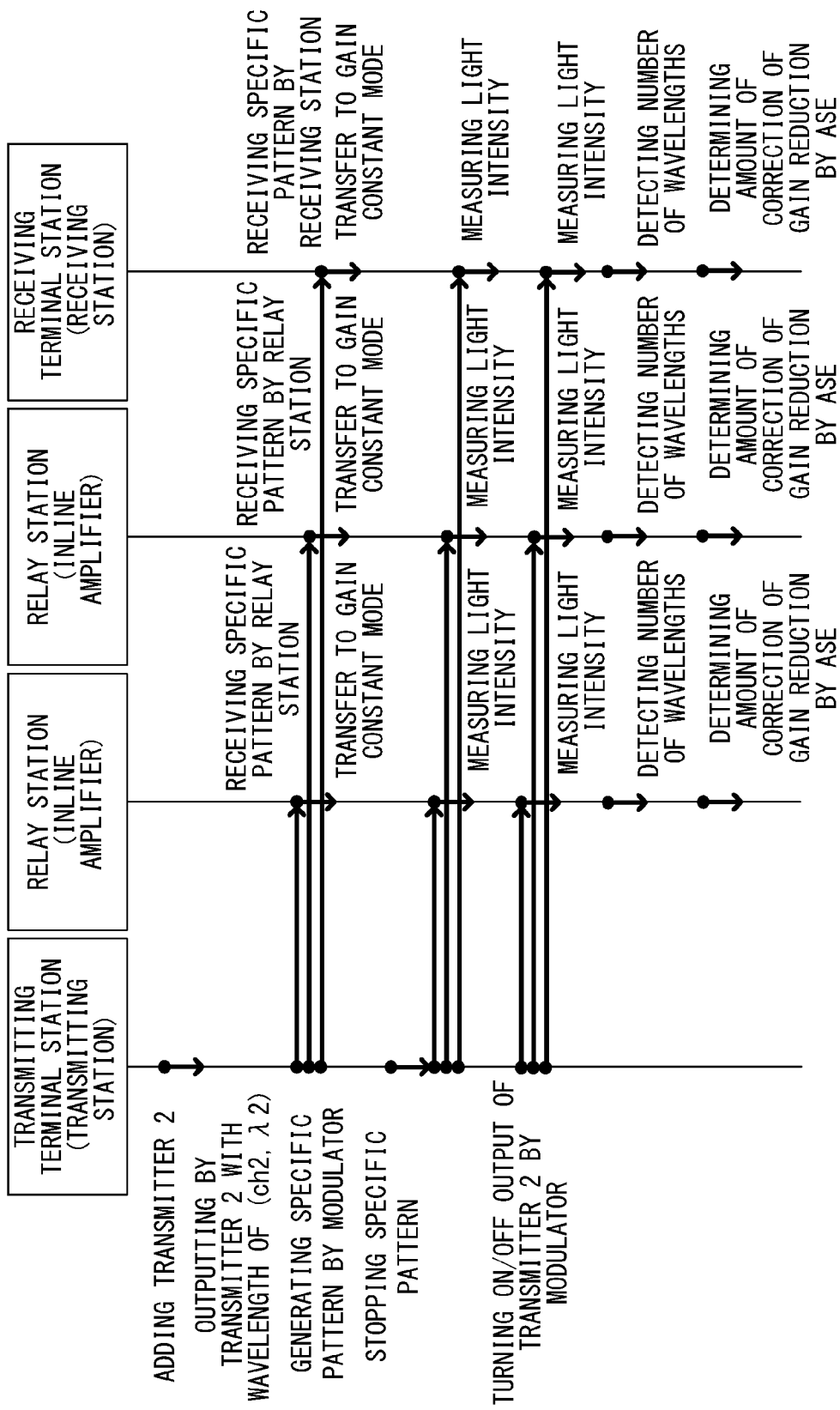
FIG. 9 is an explanatory view (7) of a first configuration example of an embodiment of the present invention.

FIG. 9 illustrates the sequence of the operation of increasing the number of wavelengths of the first configuration example.

Assume that a transmitter 2 for outputting the channel 2 (CH2) with the wavelength λ2 is added. First, the transmitter 2 is added in the transmitting terminal station (transmitting station). Next, the transmitter 2 outputs the channel 2 with the wavelength λ2. Then, the transmitter 2 modulates the intensity with the specific pattern by the modulator and transmits signal light. The relay station and the receiving terminal station (receiving station) receive the specific pattern, and transfers to a gain constant mode (AGC control mode). After waiting for a standby time, the transmitter 2 stops the transmission of the specific pattern. The relay station and the receiving terminal station continue detecting (measuring) with the photodiode of the light intensity on the input side of the optical amplifier. In the transmitting terminal station, the transmitter 2 turns on and off the output by the modulator, and performs the transmission. The relay station and the receiving terminal station detects (measures) the light intensity of the ON/OFF operation, and detects the number of wavelengths after the addition based on the graph of (a) or (b) in FIG. 4. Based on the number of wavelengths after the addition, the amount of correction of the gain reduction by the ASE in the optical amplifier is determined, and gain control is performed.

Figure 10:
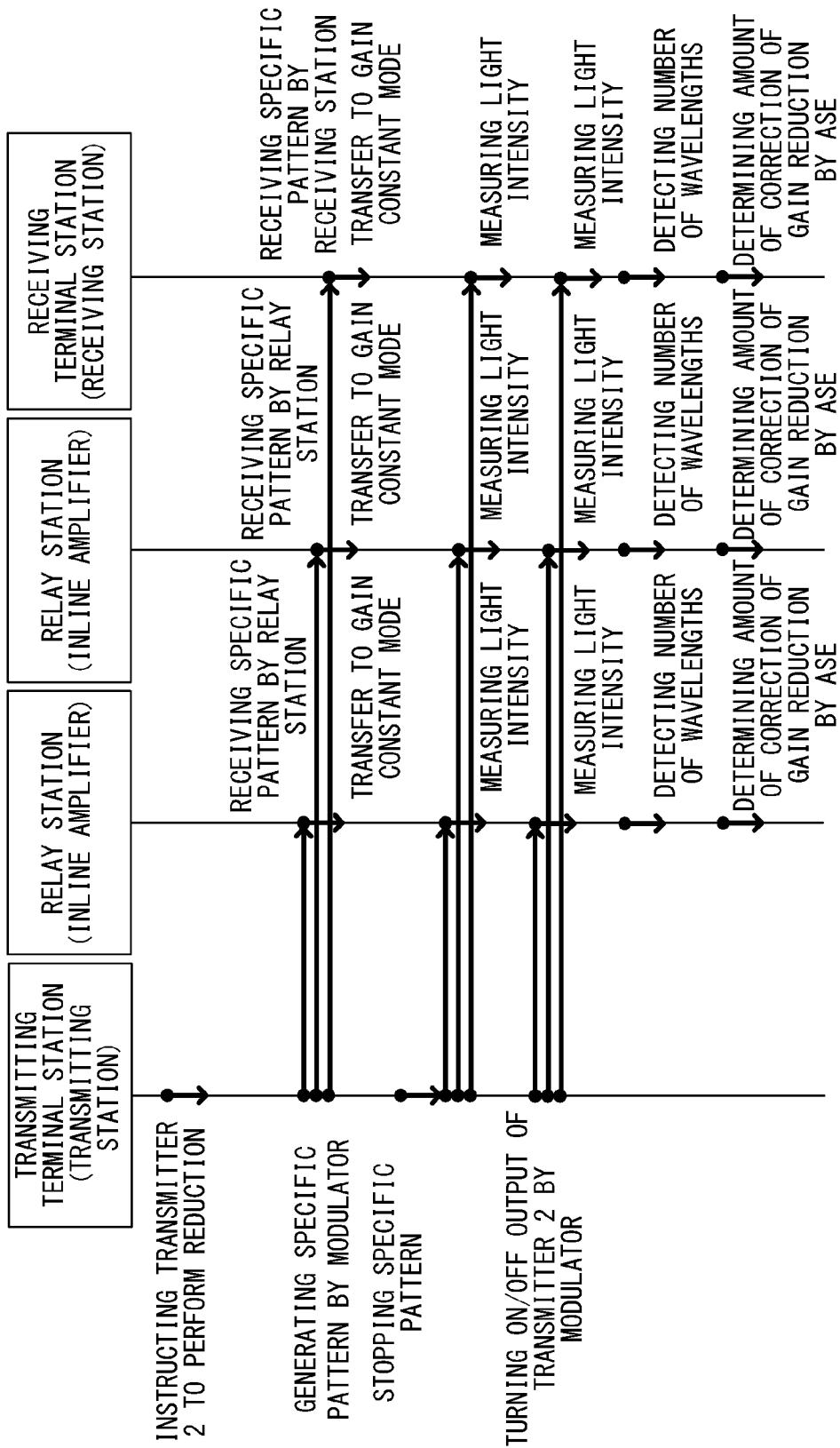
FIG. 10 is an explanatory view (8) of a first configuration example of an embodiment of the present invention.

FIG. 10 is the sequence of the reducing operation in the first configuration example.

Assume that the transmitter 2 is to be deleted. First, the transmitting terminal station instructs the transmitter 2 to perform a reduction. The transmitter 2 uses the modulator to modulate the intensity on the specific pattern, and transmits signal light. Upon receipt of the specific pattern, the relay station and the receiving terminal station transfer to the gain constant mode (AGC mode). After the lapse of the standby time, the transmitter 2 stops the transmission of the specific pattern. The relay station and the receiving terminal station continue detecting (measuring) the light intensity on the input side of the optical amplifier. Next, the transmitter 2 transmits the signal light whose output has been turned ON/OFF by the modulator. The relay station and the receiving terminal station measure the light intensity of the ON/OFF operation, and detect the number of wavelengths after the reduction based on the graph of (a) or (b) in FIG. 4. Then, the amount of correction of the gain reduction by the ASE of each optical amplifier is determined from the number of wavelengths after the reduction, and the optical amplifier is controlled.

FIGS. 11 through 15 are explanatory views of the second configuration example according to the present embodiment.

In the second configuration example, the case in which the number of wavelengths to be simultaneously added or reduced is two or more is described below.

Consider the case in which a plurality of transmitters (wavelengths) are simultaneously added or reduced.

In the system including a large number of wavelengths, the transmitter may be implemented as being divided into a plurality of racks. The power supply to the transmitter is performed through the respective racks. Therefore, when the power supply is turned ON/OFF with the racks, the outputs of a plurality of transmitters are simultaneously turned ON/OFF, for example, when the power supply function of a rack stops for any accident or fault.

In the second configuration example, it is requested that the number of wavelengths in the initial state before the addition or reduction of the number of wavelengths is known in advance (in the first configuration example, the wavelength number information in the initial state is not requested).

FIG. 11 is a system configuration example in the second configuration example in the present embodiment.

In FIG. 11, the component also illustrated in FIG. 3 is assigned the same reference numeral, and the explanation is omitted here.

The system is configured by terminal stations (transmitting and receiving stations) 11a and 12, and the relay station 15 in which an inline optical amplifier is arranged. The transmitters 10-1 through 10-n connected in the terminal station 11a on the transmitting side are provided with a modulator 50 for the modulation of the light intensity. The modulator 50 is to assign the specific pattern with the same timing (that is, in a synchronous state) to all transmitters 10-1 through 10-n arranged in the terminal station 11a. A switch 51 selects the transmitter for transmission of the specific pattern, and transmits a signal of the specific pattern.

Figure 12:
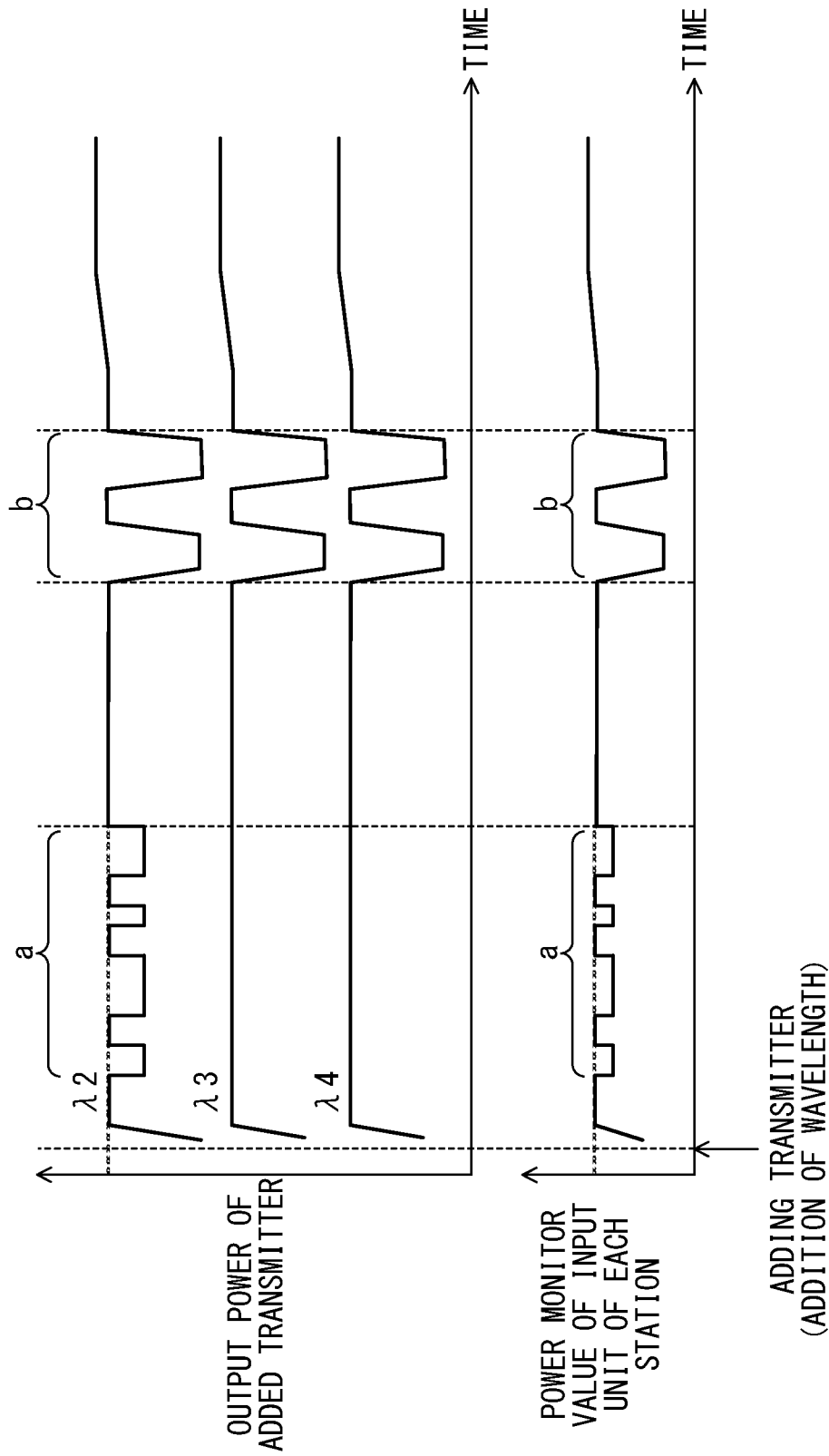
FIG. 12 is an explanatory view (2) of a second configuration example of an embodiment of the present invention.

FIG. 12 illustrates the transfer of the light intensity of the light of the signal transmitted by the transmitter and received by each station. (1) in FIG. 12 indicates the fluctuation of the light intensity of the signal light transmitted by the transmitter. (2) in FIG. 12 indicates the fluctuation of the light intensity of the signal light received by the relay station and the receiving terminal station. The specific pattern is output from one of the transmitters which have been simultaneously added. In (1) in FIG. 12, the specific pattern of a is transmitted from the transmitter which transmits the signal light of the wavelength λ2. The specific pattern is detected as a in (2) in FIG. 12 by the relay station or the receiving terminal station. The ON/OFF operation is performed by all added or reduced transmitters as illustrated in b in (1) in FIG. 12. In (1) in FIG. 12, the transmitter which transmits the signal light of wavelength λ2, λ3, and λ4 performs the ON/OFF operation. As illustrated in b in (2) in FIG. 12, the relay station and the receiving terminal station detect the fluctuation of the light intensity by the ON/OFF operation.

FIG. 13 illustrates the amount of fluctuation of the total optical power when any number of wavelengths is added from the state of a certain number of wavelengths.

When the number of wavelengths in the initial state is known from the graph in FIG. 13, the number of wavelengths after the addition or reduction of the wavelengths may be known from the amount of fluctuation of the total optical power. In the case of the addition, the point corresponding to the detected amount of fluctuation of power is obtained on the curve of the number of wavelengths before the addition in the graph in FIG. 13, and the number of wavelengths on the vertical axis corresponding to the point is the number of wavelengths after the addition. In the case of the reduction, the number of wavelengths on the vertical axis in the graph in FIG. 13 is the number of wavelengths before the reduction, and the number of wavelengths after the reduction may be obtained by determining the curve on which the corresponding amount of fluctuation of power is placed.

The configurations of the relay station and the receiving terminal station are the same as in FIG. 7, but the memory 30 stores the number of wavelengths before the addition or reduction and the data of the graph in FIG. 13, and the wavelength number detection unit 31 refers to the data of the graph to acquire the number of wavelengths after the addition or reduction. The data of the graph in FIG. 13 may be obtained by a simulation or through an experiment. To consider the variance of the characteristic of the actual device, it is effective to actually perform the experiment.

Figure 14:
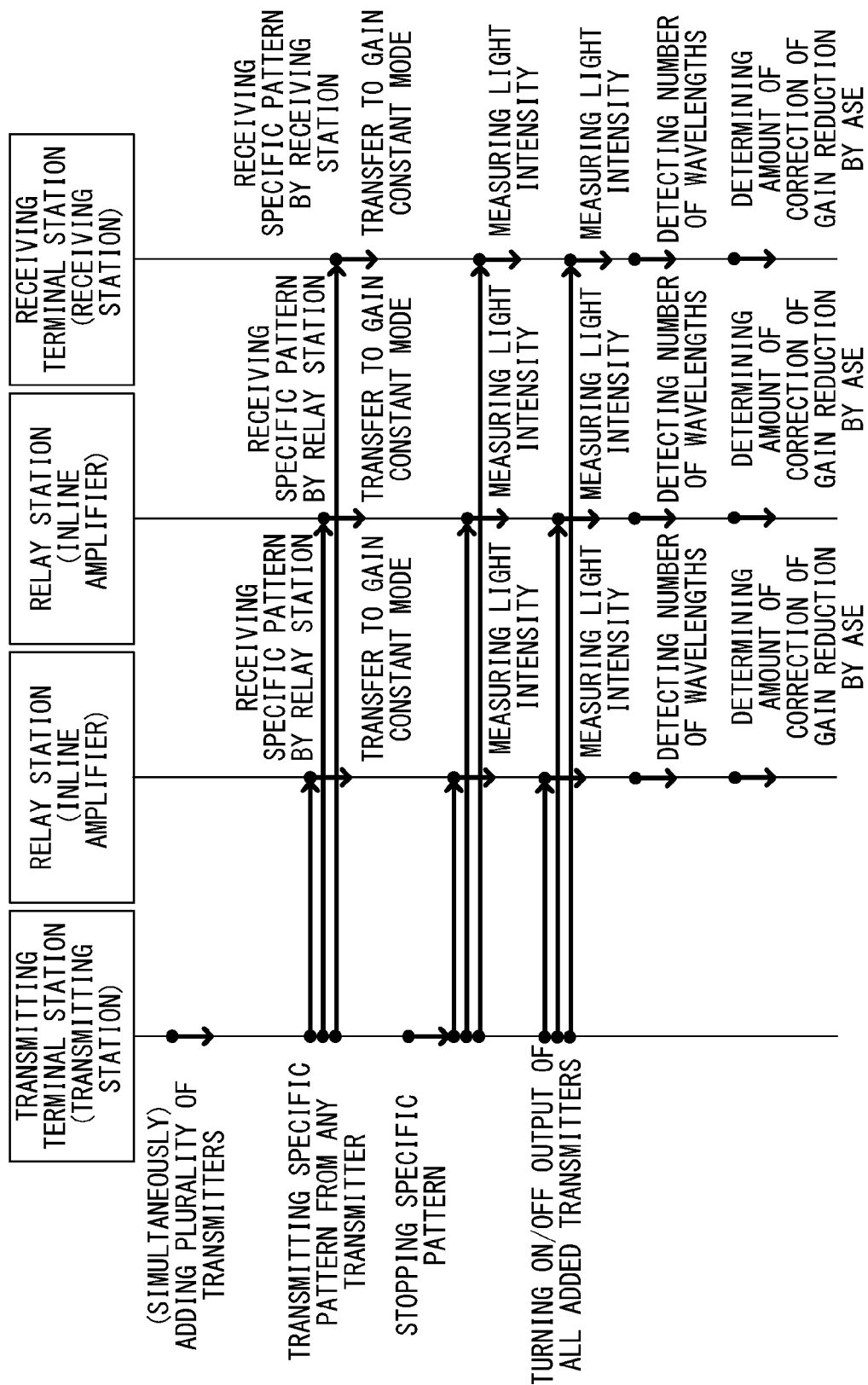
FIG. 14 is an explanatory view (4) of a second configuration example of an embodiment of the present invention.

FIG. 14 is a sequence of the flow of the adding process in the second configuration example.

First, in the transmitting terminal station, a plurality of transmitters are simultaneously added. Next, the specific pattern is transmitted from any of the added transmitters. In the relay station and the receiving terminal station, when a specific pattern is detected, the optical amplifier is changed to the gain constant mode (AGC control mode). After the lapse of the standby time, the transmitter stops the transmission of the specific pattern. Then, the relay station and the receiving terminal station continue detecting (measuring) the light intensity of the output of all transmitters. Next, the transmitting terminal station turns ON/OFF the output of all added transmitters. The relay station and the receiving terminal station detect (measure) the light intensity when the outputs of all added transmitters are turned ON and OFF. Then, each of the relay station and receiving terminal station obtains the amount of fluctuation of the light intensity from the light intensity when all added transmitters are turned ON and the light intensity when they are turned OFF, and determines the number of wavelengths after the addition based on the data of the graph in FIG. 13. Then, based on the determined number of wavelengths, the amount of correction of the gain reduction of the optical amplifier by the ASE is determined, and the gain of the optical amplifier is controlled.

Figure 15:
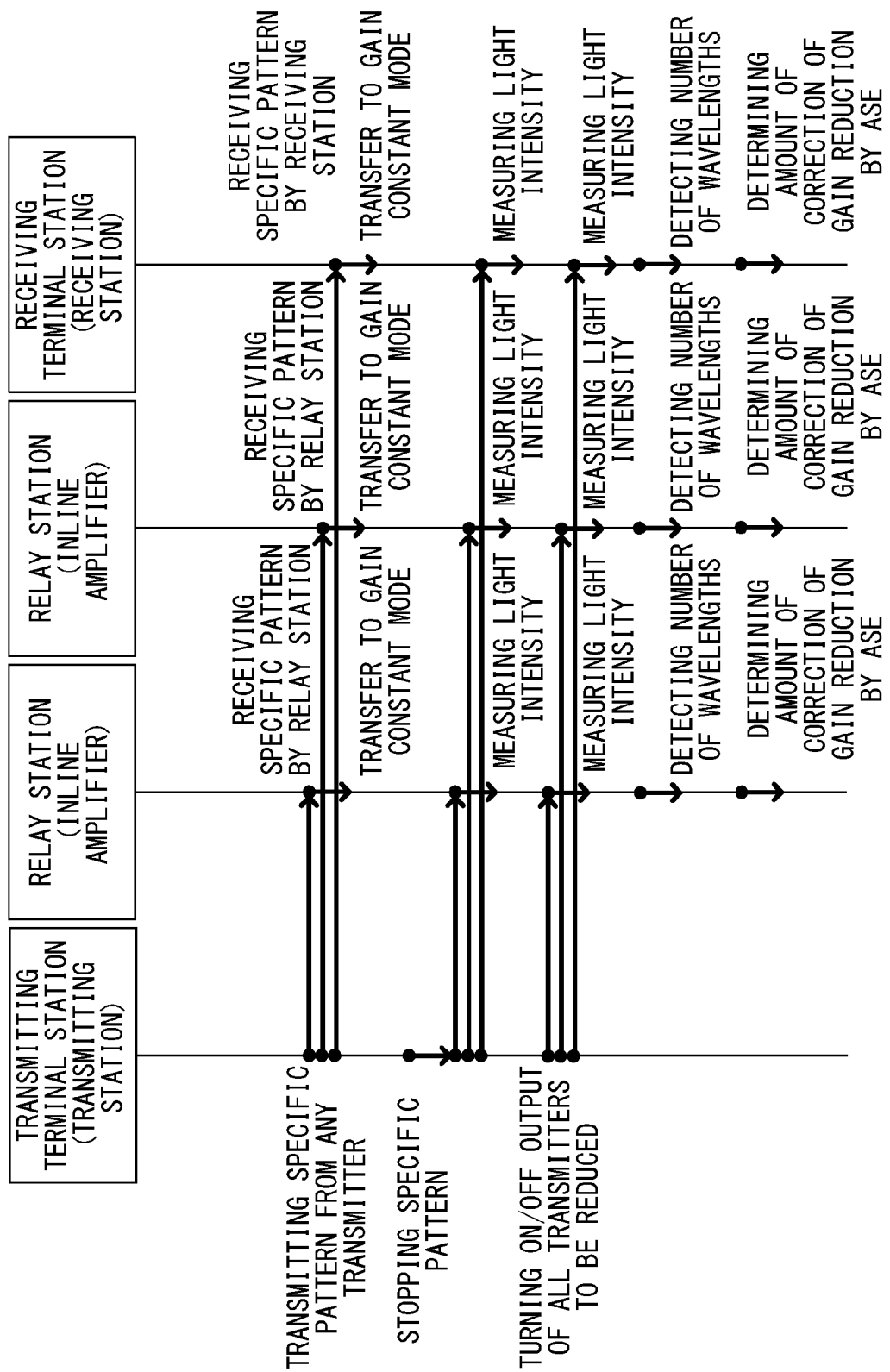
FIG. 15 is an explanatory view (5) of a second configuration example of an embodiment of the present invention.

FIG. 15 is a sequence of the flow of the reducing process in the second configuration example.

First, the transmitting terminal station transmits a specific pattern from any of the transmitters to be reduced. When the relay station and the receiving terminal station detect the specific pattern, they change the optical amplifier to the gain constant mode (AGC control mode). After a lapse of the standby time, the transmitter stops the transmission of the specific pattern. Then, the relay station and the receiving terminal station continues detecting (measuring) the light intensity of the outputs of all transmitters. Then, the transmitting terminal station turns ON/OFF the outputs of all transmitters to be reduced. The relay station and the receiving terminal station detect (measure) the light intensity when the outputs of all transmitters to be reduced are turned ON and OFF. Then, each of the relay station and the receiving terminal station obtains the amount of fluctuation of the light intensity from the light intensity when all transmitters to be reduced are turned ON and the light intensity when they are turned OFF, and determines the number of wavelengths after the reduction from the data of the graph in FIG. 13. Then, based on the determined number of wavelengths, the amount of correction of the gain reduction of the optical amplifier by the ASE is determined to control the gain of the optical amplifier.

FIGS. 16 through 19 are explanatory views of the third configuration example of the present embodiment.

In the present embodiment, the accuracy of the detection of the number of wavelengths is to be enhanced when the wavelength of the signal light to be added or reduced is largely different from the wavelength of the original signal light.

For example, assume that the wavelength $\lambda 2$ is added to the state in which one wavelength of $\lambda 1$ is in operation. Generally, the loss of an optical fiber depends on the wavelength of light.

When the wavelength $\lambda 1$ is close to the wavelength $\lambda 2$ (for example, they are adjacent to each other, that is, are different by about 1 nm), the amount of loss of the wavelengths of $\lambda 1$ and $\lambda 2$ when an optical fiber is transmitted is substantially equal. In this case, the close wavelength is explained as follows by the amount of loss when the optical fiber is transmitted. That is, the two wavelengths are close to each other if the difference in loss of the two wavelengths after the propagation is about 0.1 dB. This normally holds true with a relatively small WDM transmission device having a small number of wavelengths.

On the other hand, when the values of the wavelengths $\lambda 1$ and $\lambda 2$ are quite different from each other, the amount of loss is also quite different between two wavelengths. Therefore, the fluctuation of the light intensity is unexpectedly large, the accuracy in obtaining the number of wavelengths from the amount of fluctuation of the light intensity indicated by (a) and (b) in FIG. 4 may be degraded. This is caused by the loss of an optical fiber as a transmission line which depends on the wavelength of the signal light. Two quite different wavelengths imply that they are not close to each other as described above. For example, there is a ½ difference in bandwidth of C-band or a ¼ difference in wavelength.

FIG. 16 illustrates the following conditions as an example.

| | |
|---|---|
| Distance between stations | 100 km |
| Fiber loss between stations | 20 dB |
| Number of relay stations | 2 |
| Number of spans between stations (number of transmission lines) | 3 |
| Average output power per wave of optical amplifier output | 0 dBm |
| Wavelength difference between transmitters 1 and 2 | 15 nm or 7 nm |

As known from FIG. 16, the amount of fluctuation of power depends on the difference between two wavelengths. The smaller the number of wavelengths, the larger the influence of loss of the optical fiber as a transmission line on the characteristic of wavelengths.

In the third configuration example, when the wavelength of the signal light to be added or reduced is known, the data of the graph of the amount of fluctuation of power and the number of wavelengths in the form indicated by (a) and (b) in FIG. 4 is to be prepared depending on the wavelength difference from FIG. 16, thereby specifying the number of wavelengths with high accuracy.

The wavelength of the signal light to be added or reduced is specified in the following method.

Recently, a transmitter capable of arbitrarily selecting the wavelength of output light is applied in many cases. Then, different specific patterns are prepared separately depending on the wavelength set for a transmitter.

Figure 17:
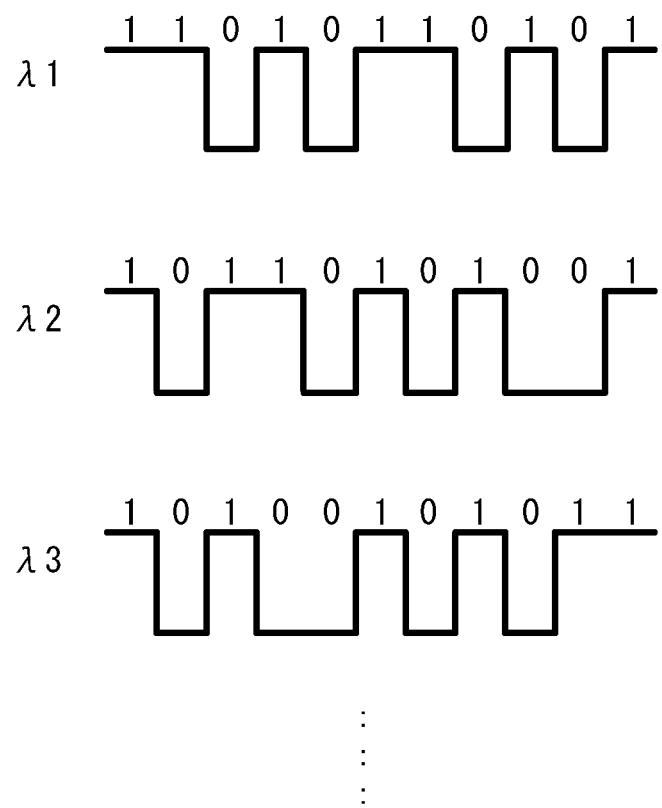
FIG. 17 is an explanatory view (2) of a third configuration example of an embodiment of the present invention.

FIG. 17 is an example of a specific pattern for each wavelength.

In FIG. 17, the wavelength $\lambda 1$ is assigned "11010110101", the wavelength $\lambda 2$ is assigned "10110101001", and the wavelength $\lambda 3$ is assigned "10100101011". FIG. 17 is an example, and the specific pattern for each wavelength may be arbitrarily set so far as patterns are different from one another.

The relay station designates the wavelength of a signal to be added or reduced depending on the specific pattern, and selects the data of the graph from the fluctuation of power to the number of wavelengths depending on the wavelength. In this example, the addition and reduction is to be performed on each wavelength to avoid no detection of the specific pattern by simultaneous transmissions of different specific patterns.

The configurations of the optical amplifiers of the relay station and the receiving terminal station are the same as those in FIG. 7, and the data of the graph corresponding to (a) and (b) in FIG. 4 provided for each wavelength difference is stored in advance in the memory 30 to be referenced by the wavelength number detection unit 31.

FIG. 18 is a sequence of the adding operation according to the third configuration example.

Assume that the transmitter 2 for outputting the channel (CH2) with the wavelength λ2 is added. First, the transmitting terminal station (transmitting station) adds the transmitter 2. Next, the transmitter 2 outputs the channel 2 with the wavelength λ2. Then, the transmitter 2 transmits the signal light by allowing the modulator to modulate the intensity with the specific pattern. The relay station and the receiving terminal station (receiving station) receive the specific pattern, and enters the gain constant mode (AGC control mode). After waiting for the standby time, the transmitter 2 stops the transmission of the specific pattern. The relay station and the receiving terminal station continues detecting (measuring) the light intensity on the input side of the optical amplifier with a photodiode. In the transmitting terminal station, the transmitter 2 turns ON/OFF the output by the modulator, and performs a transmission. The relay station and the receiving terminal station detect (measure) the light intensity of the ON/OFF operation, and detect the number of wavelengths based on the data of the graph depending on the wavelength difference. The amount of correction of the gain reduction by the ASE in the optical amplifier is determined based on the number of wavelengths after the addition, thereby performing the gain control.

FIG. 19 is a sequence of the reducing operation according to the third configuration example.

Assume that the transmitter 2 is reduced. First, the transmitting terminal station instructs the transmitter 2 to reduce the transmitter. The transmitter 2 transmits the signal light by allowing the modulator to modulate the intensity. Upon receipt of the specific pattern, the relay station and the receiving terminal station enter the gain constant mode (AGC mode). After the lapse of the standby time, the transmitter 2 stops the transmission of the specific pattern. The relay station and the receiving terminal station continue detecting (measuring) the light intensity on the input side of the optical amplifier. Next, the transmitter 2 transmits the signal light whose output is turned ON/OFF by the modulator. The relay station and the receiving terminal station measure the light intensity of the ON/OFF operation, and detect the number of wavelengths after the reduction based on the data of the graph depending on the wavelength difference. Then, from the number of wavelengths after the reduction, the amount of correction of the gain reduction by the ASE of each optical amplifier is determined, thereby controlling the optical amplifier.

In the embodiment above, the optical output of the transmitter is simply described as ON/OFF, but the frequency of the ON/OFF operation is not limited to a specific number. That is, it may be one or more so far as all relay stations and receiving terminal stations may determine the frequency of determining the number of wavelengths.

According to the embodiment above, the number of wavelengths may be acquired without an information transmission device between the stations by the OSC etc., and the information may be applied to the correction of the reduction of a gain by the ASE. Therefore, no device for OSC transmission and reception is required, and the degradation of the transmission characteristics may be prevented with the total cost reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A wavelength division multiplexing transmission device in a wavelength division multiplexing transmission system which transmits signal light from a transmitting terminal station, the device comprising:
   an optical intensity detection unit configured to detect light intensity of signal light transmitted from the transmitting terminal station when an output of a transmitter added or reduced in the transmitting terminal station is turned ON and OFF; and
   a wavelength number detection unit configured to detect a number of wavelengths corresponding to a number of transmitters after being added or reduced, the wavelength number detection unit detecting the number of wavelengths based on an amount of fluctuation of the light intensity between a first light intensity of the signal light detected by the optical intensity detection unit when the output of the transmitter is turned ON and a second light intensity of the signal light detected by the optical intensity detection unit when the output of the transmitter is turned OFF.

2. The device according to claim 1, further comprising
   an optical amplification unit configured to amplify the signal light, wherein
   a gain of the optical amplifier is controlled depending on the detected number of wavelengths.

3. The device according to claim 2, wherein before the transmitter turns ON and OFF the output, a signal obtained by intensity-modulating the signal light using a signal of a specific pattern is output.

4. A wavelength division multiplexing transmission device in a wavelength division multiplexing transmission system which transmits signal light from a transmitting terminal station, the device comprising:
   an optical intensity detection unit configured to detect light intensity of signal light transmitted from the transmitting terminal station when an output of a transmitter added or reduced in the transmitting terminal station is turned ON and OFF;
   a wavelength number detection unit configured to detect a number of added or reduced wavelengths from an amount of fluctuation of the light intensity detected by the optical intensity detection unit when the output of the transmitter is turned ON and OFF; and
   an optical amplification unit configured to amplify the signal light,
   wherein:
      a gain of the optical amplifier is controlled depending on the detected number of wavelengths,
      before the transmitter turns ON and OFF the output, a signal obtained by intensity-modulating the signal light using a signal of a specific pattern is output, and
      when the signal intensity-modulated by the specific pattern is received, the optical amplifier is set under gain constant control.

5. A wavelength division multiplexing transmission device in a wavelength division multiplexing transmission system which transmits signal light from a transmitting terminal station, the device comprising:

an optical intensity detection unit configured to detect light intensity of signal light transmitted from the transmitting terminal station when an output of a transmitter added or reduced in the transmitting terminal station is turned ON and OFF; and a wavelength number detection unit configured to detect a number of added or reduced wavelengths from an amount of fluctuation of the light intensity detected by the optical intensity detection unit when the output of the transmitter is turned ON and OFF, wherein a number of wavelengths after an addition or reduction is detected from the amount of fluctuation of light intensity when a plurality of transmitters are simultaneously turned ON and OFF according to information about the number of wavelengths before a plurality of wavelengths are simultaneously added or reduced.

6. The device according to claim 5, wherein the specific pattern is unique for each different wavelength.

7. A wavelength division multiplexing transmission device in a wavelength division multiplexing transmission system which transmits signal light from a transmitting terminal station, the device comprising:

an optical intensity detection unit configured to detect light intensity of signal light transmitted from the transmitting terminal station when an output of a transmitter added or reduced in the transmitting terminal station is turned ON and OFF;

a wavelength number detection unit configured to detect a number of added or reduced wavelengths from an amount of fluctuation of the light intensity detected by the optical intensity detection unit when the output of the transmitter is turned ON and OFF; and a storage unit configured to store data of a graph indicating a relationship between a number of wavelengths and the amount of fluctuation of light intensity, wherein the wavelength number detection unit refers to the data of the graph and detects the number of wavelengths.

8. The device according to claim 7, wherein
the data of the graph indicating the relationship between the number of wavelengths and the amount of fluctuation of light intensity is provided for each wavelength difference between a wavelength of a signal not added or reduced and a wavelength of a signal added or reduced.

9. A wavelength division multiplexing transmission system, the device comprising:

a transmitting terminal station configured to transmitting, from a transmitter to be added or reduced, signal light by turning ON and OFF an output; and a relay station and receiving terminal station comprising:
an optical intensity detection unit configured to detect light intensity of signal light transmitted from the transmitting terminal station when the output of a transmitter added or reduced in the transmitting terminal station is turned ON and OFF; and a wavelength number detection unit configured to detect a number of wavelengths corresponding to a number of transmitters after being added or reduced, the wavelength number detection unit detecting the number of wavelengths based on an amount of fluctuation of the light intensity between a first light intensity of the signal light detected by the optical intensity detection unit when output of the transmitter is turned ON and a second light intensity of the signal light detected by the optical intensity detection unit when the output of the transmitter is turned OFF.

10. A method for detecting a number of wavelengths, comprising:

transmitting signal light from a transmitter to be added or reduced in a transmitting terminal station by turning ON and OFF an output;

detecting light intensity of signal light transmitted when output of a transmitter to be added or reduced in the transmitting terminal station is turned ON and OFF; and detecting a number of wavelengths corresponding to a number of transmitters after being added or reduced, the wavelength number detection unit detecting the number of wavelengths based on an amount of fluctuation of light intensity between a first light intensity of the signal light detected in the light intensity detecting when the output of the transmitter is turned ON and a second light intensity of the signal light detected by the light intensity detecting when the output of the transmitter is turned OFF.

* * * * *